US012779346B2

(12) United States Patent
Xue et al.

(10) Patent No.: US 12,779,346 B2
(45) Date of Patent: Nov. 3, 2026

(54) VIRTUAL VEHICLE CONTROL

(71) Applicant: Tencent Technology (Shenzhen) Company Limited, Shenzhen (CN)

(72) Inventors: Haosheng Xue, Shenzhen (CN); Jinlong Tu, Shenzhen (CN); Zhipeng Luo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 147 days.

(21) Appl. No.: 18/751,588

(22) Filed: Jun. 24, 2024

(65) Prior Publication Data

US 2024/0350926 A1 Oct. 24, 2024

Related U.S. Application Data

(63) Continuation of application No. PCT/CN2023/087294, filed on Apr. 10, 2023.

(30) Foreign Application Priority Data

May 20, 2022 (CN) ......................... 202210557470.2

(51) Int. Cl.
*A63F 13/803* (2014.01)
*A63F 13/537* (2014.01)

(52) U.S. Cl.
CPC .......... *A63F 13/803* (2014.09); *A63F 13/537* (2014.09)

(58) Field of Classification Search
CPC .... A63F 13/803; A63F 13/537; A63F 13/422; A63F 13/57; A63F 2300/8017
See application file for complete search history.

(56) References Cited

U.S. PATENT DOCUMENTS 7,819,742 B2 * 10/2010 Chamberlain ........... G07G 5/00 463/16
8,366,526 B2 * 2/2013 Baynes ................... A63F 13/60 463/43

(Continued)

FOREIGN PATENT DOCUMENTS

CN 101485933 A 7/2009
CN 108525295 A 9/2018

(Continued)

OTHER PUBLICATIONS

Video game Need for Speed Heat that was published by Electronic Arts and released on Nov. 8, 2019 (NFS Heat, evidenced YouTube video Need for SpeedTM Heat | Review, by HokiHoshi and published on Nov. 8, 2019, available online: https://www.youtube.com/watch?v=lu2HrBI2IMo). (Year: 2019).*

(Continued)

*Primary Examiner* — James S. McClellan
(74) *Attorney, Agent, or Firm* — Banner & Witcoff, Ltd.

(57) ABSTRACT

A method and an apparatus for controlling a virtual vehicle in a virtual scene, an electronic device, and a storage medium relate to the field of virtual scene technologies. In this application, A prop storage mechanism in which special effect action is performed to accumulate acceleration energy and an acceleration prop is added when the accumulated acceleration energy satisfies a prop addition condition is provided, one acceleration prop is consumed to accelerate a virtual vehicle when a first trigger operation is detected, and in a first period of time after the first trigger operation, if it is detected that a second trigger operation can further consume another acceleration prop, the virtual vehicle is accelerated at a higher acceleration, so that a user can flexibly select, according to a requirement, whether to consume a plurality of acceleration props each time to obtain (Continued)

a higher acceleration, thereby helping the user adjust a racing policy based on the virtual vehicle at any time.

20 Claims, 10 Drawing Sheets

(56) References Cited

U.S. PATENT DOCUMENTS

| | | | | |
|---|---|---|---|---|
| 2003/0100375 | A1* | 5/2003 | Wakae | A63F 13/45 463/43 |
| 2016/0048027 | A1 | 2/2016 | Shpigelman | |
| 2017/0262050 | A1 | 9/2017 | Li | |
| 2020/0206620 | A1* | 7/2020 | Hayashi | A63F 13/67 |
| 2021/0283500 | A1* | 9/2021 | Huang | A63F 13/44 |
| 2021/0331079 | A1* | 10/2021 | Guo | A63F 13/5378 |
| 2022/0331695 | A1* | 10/2022 | Rodriguez | A63F 13/537 |

FOREIGN PATENT DOCUMENTS

| | | | |
|---|---|---|---|
| CN | 108525303 | A | 9/2018 |
| CN | 110013671 | A | 7/2019 |
| CN | 112755531 | A | 5/2021 |
| CN | 113082691 | A | 7/2021 |
| CN | 113694526 | A | 11/2021 |

OTHER PUBLICATIONS

"Drift Master": Extreme Drifting Techniques—Nitro Usage Tips, 9game.cn, Mar. 26, 2018, https://www.9game.cn, English translation of Drift Master is unclear and unreadable.

Jul. 10, 2026—CN First Office Action—CN Application No. 202210557470.2.

* cited by examiner

VIRTUAL VEHICLE CONTROL

CROSS-REFERENCE TO RELATED APPLICATIONS

This Application is a continuation application of PCT Application PCT/CN2023/087294, filed Apr. 10, 2023, which claims priority to Chinese Patent Application No. 202210557470.2, filed on May 20, 2022, each entitled "METHOD AND APPARATUS FOR CONTROLLING VIRTUAL VEHICLE IN VIRTUAL SCENE, AND ELECTRONIC DEVICE", and each which is incorporated herein by reference in its entirety.

FIELD

This application relates to the field of virtual scene technologies, and in particular, to a method and an apparatus for controlling a virtual vehicle in a virtual scene, an electronic device, and a storage medium.

BACKGROUND

With development of computer technologies, a user can relax using various game applications on a terminal at any time. Currently, in a game application of manipulating a virtual vehicle such as a racing car game, to help a user better race using a virtual vehicle, some interaction manners configured for accelerating a virtual vehicle are usually provided.

For example, by pressing an accelerator key, a user can control a virtual vehicle to continuously accelerate. Alternatively, when a user controls a virtual vehicle to perform a special effect action such as drift, a specific amount of acceleration gas (for example, nitrous oxide, commonly known as laughing gas, whose chemical formula is $N_2O$) is gradually accumulated, and the user can also accelerate the virtual vehicle by consuming the accumulated acceleration gas.

In the foregoing interaction manners, regardless of pressing the accelerator key to accelerate or consuming the accumulated acceleration gas to accelerate, both the acceleration manner and the acceleration effect on the virtual vehicle are relatively undiversified, and human-computer interaction efficiency is low.

SUMMARY

Aspects of this application provide a method and an apparatus for controlling a virtual vehicle in a virtual scene, an electronic device, and a storage medium. The technical solutions include the following:

According to an aspect, a method for controlling a virtual vehicle in a virtual scene is provided, performed by a terminal, and including:

increasing acceleration energy when a virtual vehicle performs a special effect action;

adding one acceleration prop when the acceleration energy satisfies a prop addition condition;

consuming, when at least two acceleration props are provided, one of the acceleration props in response to a first trigger operation on an acceleration control, and controlling the virtual vehicle to perform a first acceleration action; and consuming another one of the acceleration props in response to a second trigger operation on the acceleration control in a first period of time after the first trigger operation, and controlling the virtual vehicle to perform a second acceleration action, an acceleration of the second acceleration action being greater than an acceleration of the first acceleration action.

According to an aspect, an apparatus for controlling a virtual vehicle in a virtual scene is provided, including:

an energy increase module, configured to increase acceleration energy when a virtual vehicle performs a special effect action;

a prop addition module, configured to add one acceleration prop when the acceleration energy satisfies a prop addition condition; and a control module, configured to consume, when at least two acceleration props are provided, one of the acceleration props in response to a first trigger operation on an acceleration control, and control the virtual vehicle to perform a first acceleration action, the control module being further configured to consume another one of the acceleration props in response to a second trigger operation on the acceleration control in a first period of time after the first trigger operation, and control the virtual vehicle to perform a second acceleration action, an acceleration of the second acceleration action being greater than an acceleration of the first acceleration action.

In a possible implementation, the control module is further configured to:

control, based on a first acceleration associated with the acceleration prop, the virtual vehicle to perform the first acceleration action, where in a process of performing the first acceleration action, a traveling speed of the virtual vehicle does not exceed a first speed threshold, the first speed threshold is determined according to a limiting speed of the virtual vehicle and a first speed increment, and the first speed increment is an acceleration by which a single one of the acceleration props is capable of increasing.

In a possible implementation, the control module is further configured to:

control, when a difference between a traveling speed of the virtual vehicle and the first speed threshold is greater than a first speed difference, the virtual vehicle to perform a uniform acceleration action at the first acceleration; and control, when a difference between a traveling speed of the virtual vehicle and the first speed threshold is less than or equal to the first speed difference, the virtual vehicle to perform a non-uniform acceleration action at a first variable acceleration obtained based on attenuation of the first acceleration.

In a possible implementation, the first variable acceleration is obtained by linearly attenuating the first acceleration as an initial acceleration according to non-uniform acceleration duration of the virtual vehicle; and when a traveling speed of the virtual vehicle reaches the first speed threshold, the first variable acceleration is attenuated to 0.

In a possible implementation, the apparatus further includes:

a playback module, configured to play a first trigger special effect of the acceleration control in response to the first trigger operation on the acceleration control, where the first trigger special effect is configured for hinting that one of the acceleration props is consumed to accelerate the virtual vehicle.

In a possible implementation, the apparatus further includes:

a display module, configured to display a first acceleration special effect of the virtual vehicle in response to the first trigger operation on the acceleration control, where the first acceleration special effect is configured for indicating that one of the acceleration props is consumed to accelerate the virtual vehicle.

In a possible implementation, the apparatus further includes:

a display module, configured to display, when the acceleration prop is acceleration gas, consumption progress information of the acceleration gas in response to the first trigger operation on the acceleration control, where the consumption progress information is configured for hinting a remaining gas storage capacity of the acceleration gas.

In a possible implementation, the control module is further configured to:

control, based on a third acceleration obtained by adding a first acceleration associated with the acceleration prop to a second acceleration, the virtual vehicle to perform the second acceleration action, where in a process of performing the second acceleration action, a traveling speed of the virtual vehicle does not exceed a second speed threshold, and the second speed threshold is a limiting speed of the virtual vehicle accelerated by the at least two acceleration props.

In a possible implementation, the control module is further configured to:

control, when a difference between a traveling speed of the virtual vehicle and the second speed threshold is greater than a second speed difference, the virtual vehicle to perform a uniform acceleration action at the third acceleration; and control, when a difference between a traveling speed of the virtual vehicle and the second speed threshold is less than or equal to the second speed difference, the virtual vehicle to perform a non-uniform acceleration action at a second variable acceleration obtained based on attenuation of the third acceleration.

In a possible implementation, the second variable acceleration is obtained by linearly attenuating the third acceleration as an initial acceleration according to non-uniform acceleration duration of the virtual vehicle; and when a traveling speed of the virtual vehicle reaches the second speed threshold, the second variable acceleration is attenuated to 0.

In a possible implementation, the apparatus further includes:

a display module, configured to display an interaction counting control in the first period of time after the first trigger operation, where the interaction counting control is configured for displaying counting information for the first period of time.

In a possible implementation, the apparatus further includes:

a playback module, configured to play a second trigger special effect of the acceleration control in response to the second trigger operation on the acceleration control, where the second trigger special effect is configured for hinting that another one of the acceleration props is consumed to accelerate the virtual vehicle.

In a possible implementation, the apparatus further includes:

a display module, configured to display a second acceleration special effect of the virtual vehicle in response to the second trigger operation on the acceleration control, where the second acceleration special effect is configured for indicating that another one of the acceleration props is consumed to accelerate the virtual vehicle.

In a possible implementation, the apparatus further includes:

a display module, configured to display an inventory quantity and an inventory capacity of the acceleration props, where the inventory capacity is associated with a vehicle type of the virtual vehicle, and the inventory capacity is configured for indicating a threshold of a quantity of the acceleration props that are allowed by the vehicle type to be stored.

In a possible implementation, the energy increase module is further configured to:

display an increase in the acceleration energy in an energy progress bar of the acceleration energy.

In a possible implementation, when the special effect action is a drift action, an energy increment of the acceleration energy is in a positive correlation with drift duration in which the virtual vehicle performs the drift action and a drift deceleration amount.

According to an aspect, an electronic device is provided, including one or more processors and one or more memories, the one or more memories having at least one computer program stored therein, and the at least one computer program being loaded and executed by the one or more processors to implement the foregoing method for controlling a virtual vehicle in a virtual scene.

According to an aspect, a storage medium is provided, having at least one computer program stored therein, the at least one computer program being loaded and executed by a processor to implement the foregoing method for controlling a virtual vehicle in a virtual scene.

According to an aspect, a computer program product is provided, including at least one computer program, the at least one computer program being stored in a computer-readable storage medium. One or more processors of an electronic device can read the at least one computer program from the computer-readable storage medium, and the one or more processors execute the at least one computer program to enable the electronic device to perform the foregoing method for controlling a virtual vehicle in a virtual scene.

The technical solutions provided in the aspects of this application have at least the following beneficial effects:

A prop storage mechanism in which special effect action is performed to accumulate acceleration energy and an acceleration prop is obtained when the accumulated acceleration energy satisfies a prop addition condition is provided, one acceleration prop is consumed to accelerate a virtual vehicle when a first trigger operation is detected, and in a first period of time after the first trigger operation, if it is detected that a second trigger operation can further consume another acceleration prop, the virtual vehicle is accelerated at a higher acceleration, so that a user can flexibly select, according to a requirement, whether to consume a plurality of acceleration props each time to obtain a higher acceleration, thereby enriching acceleration manners and acceleration effects of the virtual vehicle, making operating policies of acceleration props diversified, helping the user adjust a racing policy based on the virtual vehicle at any time, and improving human-computer interaction efficiency.

DETAILED DESCRIPTION

Figure 1:
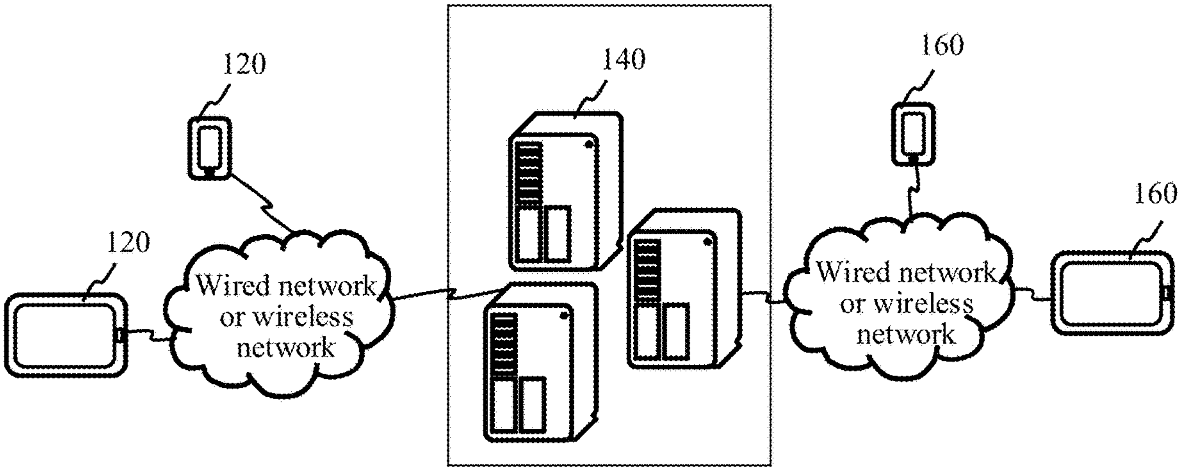
FIG. 1 is a schematic diagram of an implementation environment of a method for controlling a virtual vehicle in a virtual scene according to an aspect of this application.

When being applied to a specific product or technology using a method of the aspects of this application, each of user-related information (including but not limited to device information, personal information, behavior information, and the like), data (including but not limited to data for analysis, data for storage, data for presentation, and the like), and signals involved in this application is permitted, granted, or authorized by a user or fully authorized by parties, and collection, use, and processing of the related information, data, and signals need to obey related laws, regulations, and standards of related nations and districts. For example, all related data configured for logging in to a game and involved in this application is obtained with full authorization.

Terms involved in this application are explained below.

Virtual scene: It is a virtual environment displayed (or provided) when an application runs on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the aspects of this application. For example, the virtual scene may include the sky, the land, the ocean, or the like. The land may include environmental elements such as the desert and a city. The user may control the virtual object to drive a virtual vehicle to move in the virtual scene.

A racing car game is used as an example. The virtual scene can be further configured for providing different racing tracks under different land forms, and each racing track may be provided with different racing segments such as a straight course or a bend according to a road condition, to help at least two virtual objects drive their respective virtual vehicles to perform racing on racing tracks.

Virtual object: It is a movable object in a virtual scene. The movable object may be a virtual character, a virtual animal, a cartoon character, or the like, for example, a character, an animal, a plant, an oil drum, a wall, or a stone displayed in a virtual scene. The virtual object may be a virtual image configured for representing a user in the virtual scene. The virtual scene may include a plurality of virtual objects, and each virtual object has a shape and a volume in the virtual scene, and occupies some space in the virtual scene. In one aspect, when the virtual scene is a three-dimensional virtual scene, the virtual object may be a three-dimensional model, the three-dimensional model may be a three-dimensional character constructed based on a three-dimensional human skeleton technology, and the same virtual object may show different appearances by wearing different skins. In some aspects, the virtual objects may be alternatively implemented by using a 2.5-dimensional model or a two-dimensional model. This is not limited in the aspects of this application.

In one aspect, the virtual object may be a player character controlled through an operation on a client, or may be a non-player character (NPC) that is able to interact and that is set in a virtual scene. For example, the virtual object is a virtual character performing racing in a virtual scene. In one aspect, a quantity of virtual objects participating in the interaction in the virtual scene may be preset, or may be dynamically determined according to a quantity of clients participating in the interaction.

Racing car game: It is also referred to as a car racing game, and refers to a type of competitive game that is performed in a match scene under a winning condition that a virtual vehicle is driven to reach an end point (or destination) "fastest". The racing car game is usually relatively simple in operation and technically uncomplicated, plus a distinctive virtual racing car (an example of a virtual vehicle), superior and vivid match pictures, and an authentic sound effect is hugely popular with game players.

For example, in some racing car games, before a round begins, each user can dress up a virtual object manipulated by the user, and select a virtual vehicle to be brought into the current round (for example, select a vehicle type or perform performance modification). After the round of game begins, the user can manipulate the virtual object to drive the virtual vehicle to move in racing track in a virtual scene, and race against another virtual vehicle in the virtual scene. For example, at a round beginning moment, all virtual vehicles start from the same start point (or starting line), and a virtual object who first drives a virtual vehicle to reach an end point (or destination) wins a victory of the current battle.

Nitrous oxide system (NOS): It is also referred to as a nitrogen oxide acceleration system, and refers to an automobile acceleration system for instantaneously increasing horsepower of a large ratio using a liquid nitrogen oxide, and the working principle of the NOS is as follows: A high-pressure liquid is formed from $N_2O$ (nitrous oxide, commonly known as laughing gas), then fed into a steel bottle, and then used as a combustion-supporting agent together with air in an engine and mixed with a fuel for combustion (combustion of $N_2O$ can discharge oxygen and nitrogen, where the oxygen is a key combustion-supporting gas, and the nitrogen can assist in cooling). When $N_2O$ is at a high temperature, two nitrogen atoms and one oxygen atom are generated, where the oxygen atom is combustion-supporting, and the nitrogen atoms cool the bottle. Therefore, integrity of fuel combustion is increased, and power is improved.

Special effect action: It refers to any action that is different from stable traveling and that a user can control a virtual vehicle to perform in a racing car game. For example, special effect actions include but are not limited to: a drift action, a soaring action, a leaping action, an obstacle surmounting action, a collision action, and the like. Types of special effect actions are not specifically limited in the aspects of this application.

The following describes a system architecture related to the aspects of this application.

FIG. 1 is a schematic diagram of an implementation environment of a method for controlling a virtual vehicle in a virtual scene according to an aspect of this application. Referring to FIG. 1, the implementation environment includes: a first terminal 120, a server 140, and a second terminal 160.

An application supporting a virtual scene is run on the first terminal 120. In one aspect, the application includes: any one of a racing car game, an automobile racing game, a motorcycle racing game, a shooting game supporting a virtual vehicle, a survival game supporting a virtual vehicle, a virtual reality application, or a three-dimensional map program.

In some aspects, the first terminal 120 is a terminal used by a first user. When the application is run on the first terminal 120, a user interface of the application is displayed on a screen of the first terminal 120, and based on a round beginning operation performed by the first user in the user interface, a virtual scene is loaded and displayed in the application. The first user uses the first terminal 120 to operate a first virtual object to drive a first virtual vehicle to travel in the virtual scene. For example, the first virtual object may be a first virtual character such as a simulated character role or a cartoon character role.

The first terminal 120 and the second terminal 160 are directly or indirectly communicatively connected to the server 140 by using a wireless network or a wired network.

The server 140 includes at least one of one server, a plurality of servers, a cloud computing platform, and a virtualization center. The server 140 is configured to provide a backend service for an application supporting a virtual scene. In one aspect, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

In one aspect, the server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence (AI) platform.

An application supporting a virtual scene is run on the second terminal 160. In one aspect, the application includes: any one of a racing car game, an automobile racing game, a motorcycle racing game, a shooting game supporting a virtual vehicle, a survival game supporting a virtual vehicle, a virtual reality application, or a three-dimensional map program.

In some aspects, the second terminal 160 is a terminal used by a second user. When the application is run on the second terminal 160, a user interface of the application is displayed on a screen of the second terminal 160, and based on a round beginning operation performed by the second user in the user interface, a virtual scene is loaded and displayed in the application. The second user uses the second terminal 160 to operate a second virtual object to drive a second virtual vehicle to travel in the virtual scene. For example, the second virtual object may be a second virtual character, such as a simulated person role or a cartoon character role.

In one aspect, the first virtual object controlled by the first terminal 120 and the second virtual object controlled by the second terminal 160 are located in the same virtual scene. In this case, the first terminal 120 can control the first virtual object to drive the first virtual vehicle, to race against the second virtual vehicle driven by the second virtual object controlled by the second terminal 160. To be specific, the two virtual vehicles start from the same start point at the same moment, the two virtual vehicles can select the same racing track or different racing tracks, and a virtual vehicle that first reaches an end point wins a victory of the current game.

In one aspect, the applications installed on the first terminal 120 and the second terminal 160 are the same, or the applications installed on the two terminals are the same type of applications on different operating system platforms. Each of the first terminal 120 and the second terminal 160 may generally refer to one of a plurality of terminals, and this aspect of this application is described only by using the first terminal 120 and the second terminal 160 as an example.

The device types of the first terminal 120 and the second terminal 160 are the same or different. The device types include: at least one of a smartphone, a tablet computer, a smart speaker, a smart watch, a smart handheld game console, a portable game device, an on-board terminal, a laptop portable computer, and a desktop computer, but are not limited thereto. For example, both the first terminal 120 and the second terminal 160 are smartphones, or other handheld portable game devices. The following aspect is described by using an example that the terminal includes a smartphone.

A person skilled in the art can learn that, there may be more or fewer terminals. For example, there is only one terminal, or there are dozens of, hundreds of, or more terminals. The quantity and the device type of the terminals are not limited in this aspect of this application.

Figure 2:
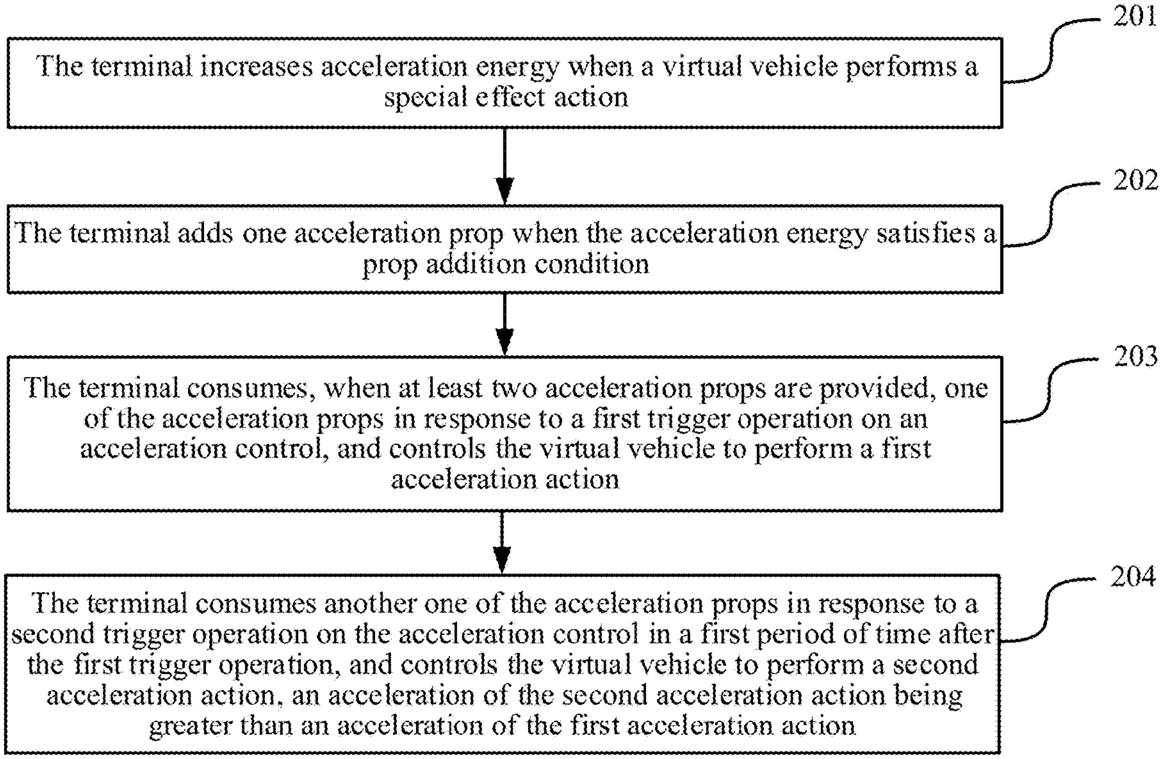
FIG. 2 is a flowchart of a method for controlling a virtual vehicle in a virtual scene according to an aspect of this application.

FIG. 2 is a flowchart of a method for controlling a virtual vehicle in a virtual scene according to an aspect of this application. Referring to FIG. 2, this aspect is performed by an electronic device, and description is made by using an example in which the electronic device is a terminal. The terminal may be the first terminal 120 or the second terminal 160 shown in the foregoing implementation environment, and this aspect includes the following operations:

201. The terminal increases acceleration energy when a virtual vehicle performs a special effect action.

The terminal involved in this aspect of this application refers to any electronic device that is used by a user and that has a function of controlling a virtual vehicle in a virtual scene. An application supporting a virtual scene is run on the terminal. In one aspect, the application includes: any one of a racing car game, an automobile racing game, a motorcycle racing game, a shooting game supporting a virtual vehicle, a survival game supporting a virtual vehicle, a virtual reality application, or a three-dimensional map program.

A virtual vehicle involved in this aspect of this application refers to a virtual vehicle that the user uses the terminal to manipulate, or a virtual vehicle that the user uses the terminal to control a virtual object to drive. In other words, the user can directly control traveling of a virtual vehicle in a virtual scene on the terminal, or can control traveling of a virtual vehicle through a virtual object in a virtual scene. Whether the user controls a virtual vehicle through a virtual object is not specifically limited in this aspect of this application.

A special effect action involved in this aspect of this application refers to any action that is different from stable traveling and that the user can control a virtual vehicle to perform in the virtual scene. For example, special effect actions include but are not limited to: a drift action, a soaring action, a leaping action, an obstacle surmounting action, a collision action, and the like. Types of special effect actions are not specifically limited in the aspects of this application.

An acceleration prop involved in this aspect of this application refers to a virtual prop for providing an acceleration function to a virtual vehicle. For example, acceleration props include: acceleration gas, acceleration fuel, acceleration BUFF, and acceleration accessory. Types of acceleration props are not specifically limited in the aspects of this application. An example in which the acceleration prop is acceleration gas is used. The acceleration gas may be $N_2O$, and $N_2O$ as liquid nitrogen oxide in an NOS system is injected into an engine to perform acceleration in a short time. Although the NOS system is commonly known as a nitrogen acceleration system, "nitrogen" for acceleration is actually not nitrogen in the air, but refers to liquid $N_2O$. If "nitrogen" is involved in subsequent examples of this application, the "nitrogen" refers to liquid $N_2O$ used in the NOS system unless otherwise specified. Similarly, each "nitrogen bottle" refers to a gas storage bottle for storing liquid $N_2O$. Details are not described below.

In some aspects, after the user starts an application such as a game application on the terminal, a virtual scene is loaded and displayed in the application in response to a round beginning operation performed by the user, and at least a virtual vehicle controlled by the terminal is displayed in the virtual scene.

In some aspects, when the inventory quantity of acceleration props is less than the inventory capacity, it indicates that there is still a surplus inventory capacity to store acceleration props. In this case, one acceleration prop can be obtained by accumulating acceleration energy when the prop addition condition is satisfied. In one aspect, if it is detected that a virtual vehicle performs any special effect action, the terminal increases acceleration energy for the virtual vehicle. Description is made by using an example in which a special effect action is a drift action. The terminal can obtain, based on drift duration in which the virtual vehicle performs a drift action and a drift deceleration amount, one energy increment of the acceleration energy positively correlated with the drift duration and the drift deceleration amount, and then determine, with reference to an original existing energy value and an energy increment of the current drift action, whether the acceleration energy accumulated in total satisfies the prop addition condition.

In one aspect, when a virtual vehicle performs different special effect actions, an energy increment of a single special effect action may differ. For example, an energy increment is in a positive correlation with an action difficulty of a special effect action performed by a virtual vehicle, that is, a larger action difficulty of a special effect action indicates a larger energy increment of a single special effect action. In one aspect, an energy increment of a single special effect action may alternatively be configured to be in a positive correlation with an action duration of a special effect action performed by a virtual vehicle, that is, longer action duration in which a special effect action is performed indicates a larger energy increment of a single special effect action.

In some aspects, the terminal displays an increase process of the acceleration energy through an energy progress bar in the virtual scene. In one aspect, a minimum energy value of the energy progress bar is 0, and a maximum energy value is an energy value required to satisfy the prop addition condition. For example, when one acceleration prop can be obtained each time a nitrogen amount of 100 is collected, the maximum energy value of the energy progress bar may be set to 100. In one aspect, the energy progress bar may be ring-shaped or strip-shaped, which is not limited in this aspect.

A manner of accumulating the acceleration energy is introduced in detail in subsequent aspects using a drift action as an example. Details are not described herein.

202. The terminal adds one acceleration prop when the acceleration energy satisfies a prop addition condition.

In some aspects, the prop addition condition is that the accumulated acceleration energy is greater than an energy threshold, where the energy threshold is any value greater than 0. For example, the energy threshold is 100, and the energy threshold is acceleration energy required to add a single acceleration prop. In one aspect, the terminal takes a sum of the existing energy value and the current energy increment accumulated through the special effect action as the acceleration energy. Assuming that the energy threshold is 100, each time acceleration energy of 100 is collected, one acceleration prop is successfully added, that is, the inventory quantity of acceleration props is increased by 1. After one acceleration prop is collected, the acceleration energy is set to zero. Then, if the inventory quantity of acceleration props is less than the inventory capacity, a new acceleration prop can still be collected again through operations 201 and 202. If the inventory quantity plus 1 equals the inventory capacity, it indicates that a new acceleration prop cannot continue to be collected again in this case.

In some other aspects, even if the inventory quantity plus 1 equals the inventory capacity, and in this case the user can further continue to collect acceleration energy by controlling a virtual vehicle to perform a special effect action, the acceleration energy is stopped from being accumulated when being about to reach the energy threshold. In this way, once the user has consumed one acceleration prop, because the acceleration energy is maintained at a value very close to the energy threshold, the user can fully collect one new acceleration prop quickly by controlling the virtual vehicle to perform a few special effect actions. For example, assuming that the energy threshold is 100, when the inventory quantity is equal to the inventory capacity, the acceleration energy is still allowed to be accumulated. However, when being accumulated to 99, the acceleration energy does not continue to increase anymore. Only after the user has consumed one acceleration prop and then increases the acceleration energy by 1 again by controlling the virtual vehicle to perform a special effect action, one new acceleration prop can be quickly obtained.

In the foregoing operation 202, a possible implementation of adding one of the acceleration props when the accumulated acceleration energy satisfies the prop addition condition is provided, that is, description is made by using an example in which accumulating the acceleration energy to the energy threshold is used as the prop addition condition, where the energy threshold is a parameter preset on a server side. For example, the energy threshold may be any value greater than 0, such as 100 or 200. In one aspect, the prop addition condition may alternatively be set to that duration in which the virtual vehicle performs a special effect action is greater than a duration threshold, or that a special effect action is performed to cause a deceleration amount of the virtual vehicle to be greater than a deceleration amount threshold, where the duration threshold and the deceleration amount threshold are values greater than 0. The prop addition condition is not specifically limited in the aspects of this application.

In the foregoing operations 201 and 202, a possible implementation in which the user manipulates a virtual vehicle to perform a special effect action, and collects an obtained acceleration prop by accumulating specific acceleration energy is shown. An example in which a special effect action is a drift action and an acceleration prop is acceleration gas $N_2O$ is used. Whether acceleration gas $N_2O$ can be fully collected as an acceleration prop is determined according to drift duration in which a virtual vehicle performs a drift action and a drift deceleration amount.

In some aspects, an acceleration prop is collected by manipulating a virtual vehicle to collide with the acceleration prop by the user. For example, a racing track in a virtual scene is provided with racing segments including a plurality of obstacles and many different types of virtual props (including an acceleration prop). When manipulating a virtual vehicle to avoid an obstacle and collide with any virtual prop, the user can pick up the virtual prop that is collided with and place it into a virtual packsack, which is equivalent to providing a manner of obtaining an acceleration prop without a drift skill.

In some aspects, an acceleration prop is purchased or exchanged by the user by consuming a specific quantity of virtual resources in a game mall before round beginning or in a round, that is, a manner of obtaining an acceleration prop neither using a drift skill nor using a driving skill of surmounting an obstacle is provided. Sources of acceleration props are not specifically limited in the aspects of this application.

203. The terminal consumes, when at least two acceleration props are provided, one of the acceleration props in response to a first trigger operation on an acceleration control, and controls the virtual vehicle to perform a first acceleration action.

The acceleration control is configured for triggering use of the acceleration prop to accelerate the virtual vehicle, thereby controlling the virtual vehicle to perform an acceleration action.

The acceleration control involved in this aspect of this application refers to a user interface (UI) control configured for triggering use of the acceleration prop to accelerate the virtual vehicle. In one aspect, the acceleration control has an interactable state and a non-interactable state. When the user possesses an acceleration prop in a game battle, the acceleration control can switch to the interactable state. When the user possesses no acceleration prop in a game battle, the acceleration control can switch to the non-interactable state. In the interactable state, after the user performs the first trigger operation on the acceleration control, use of a single acceleration prop to accelerate the virtual vehicle is triggered. In the non-interactable state, after the user performs the first trigger operation on the acceleration control, no feedback is received, or the user is reminded to collect an acceleration prop as soon as possible and then perform the first trigger operation.

In some aspects, the terminal displays an acceleration control in the virtual scene only when the virtual object or the virtual vehicle is provided with an acceleration prop, and does not display the acceleration control or hides the acceleration control when the virtual object or the virtual vehicle is not provided with any acceleration prop.

In some aspects, regardless of whether the virtual object or the virtual vehicle is provided with an acceleration prop, the acceleration control is displayed. However, the acceleration control is set to the interactable state only when an acceleration prop is provided, and the acceleration control is set to the non-interactable state when no acceleration prop is provided.

In some aspects, when possessing at least two acceleration props, the user performs the first trigger operation on the acceleration control when intending to use an acceleration prop. When detecting the first trigger operation performed by the user on the acceleration control, the terminal consumes one acceleration prop in response to the first trigger operation, and accelerates the virtual vehicle based on the one consumed acceleration prop, that is, controls the virtual vehicle to perform the first acceleration action.

In some aspects, the foregoing first trigger operation on the acceleration control includes but is not limited to: a click operation, a double-click operation, a press operation, a slide operation in a designated direction based on an acceleration control (for example, leftward slide, rightward slide, upward slide, or downward slide), a voice instruction, a gesture instruction, and the like The first trigger operation is not specifically limited in this aspect of this application.

In some aspects, when controlling, based on one consumed acceleration prop, the virtual vehicle to perform the first acceleration action, the terminal may control, according to a first acceleration manner associated with the acceleration prop, the virtual vehicle to perform the first acceleration action, where the first acceleration manner refers to an acceleration manner provided by a single acceleration prop. For example, the first acceleration manner is to apply a fixed acceleration to the virtual vehicle in first acceleration duration. The first acceleration duration is any value greater than 0. For example, the first acceleration duration is 3 seconds. The fixed acceleration is preset by a servicer at a server end. For example, the fixed acceleration is 10 km/h/s (an increment of a speed per second with kilometers per hour as the unit). In another example, the first acceleration manner is to apply a fixed acceleration to the virtual vehicle, and stop, after the traveling speed of the virtual vehicle is increased to the limiting speed of the virtual vehicle, accelerating the virtual vehicle (that is, ensure that the accelerated virtual vehicle still does not exceed the limiting speed associated with its own vehicle type), that is, control, after the traveling speed is increased to the limiting speed, the virtual vehicle not to perform the first acceleration action again. In another example, a first acceleration manner of first uniformly accelerating and then non-uniformly accelerating the virtual vehicle is introduced in detail in a next aspect, and is not described in this aspect.

In a game battle, one or more acceleration props can be provided, and different types of acceleration props can provide the same fixed acceleration or different fixed accelerations. This is not specifically limited in this aspect of this application.

In some aspects, the first acceleration manner can be further configured for increasing the limiting speed of the virtual vehicle and the increased limiting speed continuously takes effect in the first acceleration duration. For example, assuming that the original limiting speed associated with the vehicle type of the virtual vehicle is 400 km/h, when acceleration is performed in the first acceleration manner, the limiting speed of the virtual vehicle can be increased by 20 km/h and the increased limiting speed continuously takes effect in the first acceleration duration, that is, the virtual vehicle is enabled to travel at the highest limiting speed of 420 km/h in the first acceleration duration.

An increase in the limiting speed only means that the upper limit of the traveling speed of the virtual vehicle is increased, but does not mean that the traveling speed of the virtual vehicle can be definitely increased to the increased limiting speed because the initial speed of the virtual vehicle is unknown when the user performs the first trigger operation and it is very possible that the traveling speed of the virtual vehicle cannot be increased to the limiting speed through the fixed acceleration in the first acceleration duration.

In some aspects, the server delivers processing logic of the first acceleration manner to the application on the terminal, so that the terminal can locally apply the processing logic of the first acceleration manner, to accelerate the virtual vehicle, and therefore does not need to communicate with the server in the acceleration process, which can save communication overheads of the terminal. Alternatively, the server applies processing logic of the first acceleration manner in each frame of a game battle, calculates the traveling speed of the virtual vehicle in this frame, and delivers the calculated traveling speed to the terminal, which can save calculation overheads of the terminal.

204. The terminal consumes another one of the acceleration props in response to a second trigger operation on the acceleration control in a first period of time after the first trigger operation, and controls the virtual vehicle to perform a second acceleration action, an acceleration of the second acceleration action being greater than an acceleration of the first acceleration action.

In some aspects, after consuming, in response to the first trigger operation on the acceleration control, one acceleration prop to accelerate the virtual vehicle, the terminal determines any period of time in first acceleration duration of a single acceleration prop as the first period of time, that is, ensure that a start moment of the first period of time is equal to or later than an operation moment of the first trigger operation, and an end moment of the first period of time is earlier than or equal to an end moment of the first acceleration duration. In other words, the first period of time may be any period of time in a process in which a single acceleration prop still takes effect after the user performs the first trigger operation. For example, the first period of time is in 0.3 seconds to 1 second after the user performs the first trigger operation.

In some aspects, because the first trigger operation in the foregoing operation 203 consumes one acceleration prop, the user can further perform, when still possessing an acceleration prop after the consumption, the second trigger operation on the acceleration control in the first period of time, so that one (or more) other acceleration prop can be consumed again based on the one consumed acceleration prop, to control, based on a total of at least two acceleration props consumed by two trigger operations, the virtual vehicle to perform the second acceleration action, thereby providing the virtual vehicle with an acceleration effect more powerful than that of a single acceleration prop. The quantity of acceleration props consumed by the second trigger operation does not exceed the inventory quantity of acceleration props.

In some aspects, the foregoing second trigger operation on the acceleration control includes but is not limited to: a click operation, a double-click operation, a press operation, a slide operation in a designated direction based on an acceleration control (for example, leftward slide, rightward slide, upward slide, or downward slide), pressing and holding an acceleration control and then dragging it onto a virtual vehicle and releasing it, a voice instruction, a gesture instruction, and the like The second trigger operation is not specifically limited in this aspect of this application.

In some aspects, after detecting, in the first period of time, the second trigger operation performed by the user, the terminal switches the acceleration manner of the virtual vehicle from the first acceleration manner to the second acceleration manner, the second acceleration manner is also associated with an acceleration prop, and the acceleration effect provided by the second acceleration manner is superior to the acceleration effect provided by the first acceleration manner. For example, the second acceleration manner brings a higher acceleration to the virtual vehicle than the first acceleration manner does, or the second acceleration manner brings a higher limiting speed to the virtual vehicle than the first acceleration manner does, or the second acceleration manner brings both a higher acceleration and a higher limiting speed to the virtual vehicle than the first acceleration manner docs.

The second acceleration manner refers to an acceleration manner provided by a plurality of acceleration props, and may change according to the quantity of acceleration props consumed by the second trigger operation. For example, after the first acceleration prop is consumed through the first trigger operation, the second acceleration prop is further consumed through the second trigger operation. In this case, the second acceleration manner refers to an acceleration manner provided by two acceleration props. In another example, after the first acceleration prop is consumed through the first trigger operation, all remaining acceleration props (assuming that two acceleration props remain) are further consumed through the second trigger operation. In this case, the second acceleration manner refers to an acceleration manner provided by three acceleration props.

In some aspects, the same acceleration effect is configured for two or more acceleration props. For example, consumption of two acceleration props and consumption of three acceleration props achieve the same acceleration effect. In one aspect, when two or more acceleration props are consumed, different acceleration effects are configured for different quantities of consumed acceleration props. For example, an acceleration effect is positively correlated with the quantity of consumed acceleration props. For example, an acceleration effect brought by consumption of three acceleration props is greater than that brought by consumption of two acceleration props. This is not specifically limited in this aspect of this application.

In some aspects, the second acceleration manner is to superimpose an additional acceleration on the virtual vehicle based on the fixed acceleration applied by the first acceleration manner, and the superimposed additional acceleration continuously takes effect in the second acceleration duration. The second acceleration duration is any value greater than 0.

In one aspect, the second acceleration duration may refer to a period of time ranging from the beginning of the operation moment of the second trigger operation to the end moment of the first acceleration duration. In this case, the second trigger operation is equivalent to providing a more powerful acceleration effect but does not prolong duration of the acceleration prop, that is, regardless of whether a single acceleration prop or a plurality of acceleration props are consumed, the acceleration prop can be enjoyed only in the first acceleration duration, but a more powerful acceleration effect is achieved in the second acceleration duration when a plurality of acceleration props are consumed. For example, the second acceleration duration is a value obtained by subtracting a time difference between the first trigger operation and the second trigger operation from the first acceleration duration. For example, description is made using an example in which the first acceleration duration is 3 seconds, the user performs the first trigger operation on the acceleration control, to trigger consumption of one acceleration prop, and applies a fixed acceleration of 10 km/h/s to the virtual vehicle to continuously take effect for 3 seconds. After 1 second, the user further performs the second trigger operation on the acceleration control, to trigger consumption of one acceleration prop again (a total of two acceleration props are consumed). Because the first acceleration duration is 3 seconds, and a time difference between the first trigger operation and the second trigger operation is 1 second, the second acceleration duration is 2 seconds. In this case, an additional acceleration of 5 km/h/s is superimposed based on the fixed acceleration of 10 km/h/s, and this superimposed acceleration of 15 km/h/s continuously takes effect for 2 seconds. In other words, the virtual vehicle performs acceleration at the fixed acceleration of 10 km/h/s in the 1st second, and the virtual vehicle performs acceleration at the superimposed acceleration of 15 km/h/s from the 2nd second to the 3rd second.

In one aspect, the second acceleration duration may refer to a period of time ranging from the beginning of the operation moment of the second trigger operation to any moment after the end moment of the first acceleration duration. In this case, the second trigger operation is equivalent to providing a more powerful acceleration effect and adding additional acceleration duration. In this case, the second acceleration duration is not a subset of the first acceleration duration anymore, and the two pieces of acceleration duration have a specific intersection set on a timeline (the intersection set refers to a period of time ranging from the beginning of the operation moment of the second trigger operation to the end moment of the first acceleration duration).

In one aspect, the second acceleration duration may alternatively refer to a period of time ranging from the beginning of the operation moment of the second trigger operation to any moment before the end moment of the first acceleration duration. In this case, the second trigger operation is equivalent to providing a more powerful acceleration effect only in some periods of time in the first acceleration duration, and duration of the acceleration prop is not prolonged on the whole. In this case, the second acceleration duration is still a subset of the first acceleration duration. Whether acceleration duration of a single acceleration prop is prolonged using a plurality of acceleration props is not specifically limited in the aspects of this application.

In some aspects, the second acceleration manner is to increase the fixed acceleration of the virtual vehicle to target acceleration, and the target acceleration continuously takes effect in the second acceleration duration, where the target acceleration of the second acceleration manner is greater than the fixed acceleration of the first acceleration manner, and the second acceleration duration is similar to that in the previous case. Details are not described herein. To be specific, regardless of what is the fixed acceleration of the first acceleration manner, the fixed acceleration is increased to a preset target acceleration of the second acceleration manner, instead of maintaining a constant additional acceleration (that is, acceleration increment) based on the fixed acceleration.

In some aspects, regardless of the second acceleration manner (for example, providing an additional acceleration or providing a larger target acceleration) in any one of the foregoing examples, a constraint condition can be additionally added, that is, stop, after the traveling speed of the virtual vehicle is increased to the limiting speed of the virtual vehicle, accelerating the virtual vehicle (that is, ensure that the accelerated virtual vehicle still does not exceed the limiting speed associated with its own vehicle type). In another example, a first acceleration manner of first uniformly accelerating and then non-uniformly accelerating the virtual vehicle is introduced in detail in a next aspect, and is not described in this aspect.

In some aspects, the second acceleration manner can be further configured for further increasing the limiting speed of the virtual vehicle based on the first acceleration manner and the increased limiting speed continuously takes effect in the second acceleration duration. For example, assuming that the original limiting speed associated with the vehicle type of the virtual vehicle is 400 km/h, description is made by using an example in which the first acceleration duration is 3 seconds and the second acceleration duration is 2 seconds. After the user performs the first trigger operation, when acceleration is performed in the first acceleration manner, the limiting speed of the virtual vehicle is increased by 20 km/h and the increased limiting speed continuously takes effect for 3 seconds. After 1 second, the user performs the second trigger operation. When acceleration is performed in the second acceleration manner, the limiting speed of the virtual vehicle is additionally increased by 5 km/h again from the increased limiting speed of 420 km/h, that is, the virtual vehicle can travel at the highest limiting speed of 420 km/h in the 1st second and travel at the highest limiting speed of 425 km/h from the 2nd second to the 3rd second.

In a game battle, one or more acceleration props can be provided. In this case, a plurality of acceleration props may be consumed at a time in a manner of allowing only the same type of acceleration props to be combined through the first trigger operation and the second trigger operation, to achieve an optimal acceleration effect. In one aspect, a plurality of acceleration props may alternatively be consumed at a time in a manner of allowing different types of acceleration props to be combined through the first trigger operation and the second trigger operation, to achieve a diversified acceleration effect.

In some aspects, the server delivers processing logic of the first acceleration manner and the second acceleration manner to the application on the terminal, so that the terminal can locally apply the processing logic of the second acceleration manner, to accelerate the virtual vehicle, and therefore does not need to communicate with the server in the acceleration process, which can save communication overheads of the terminal. Alternatively, the server applies processing logic of the first acceleration manner and the second acceleration manner in each frame of a game battle, calculates the traveling speed of the virtual vehicle in this frame, and delivers the calculated traveling speed to the terminal, which can save calculation overheads of the terminal.

In some aspects, when the acceleration effect of the acceleration prop is exhausted (for example, acceleration gas is used up, or acceleration duration runs out), the traveling speed of the virtual vehicle does not continue to increase anymore. In this case, if the traveling speed of the virtual vehicle exceeds the original limiting speed associated with the vehicle type, the virtual vehicle gradually recovers to the original limiting speed associated with the vehicle type. For example, the original limiting speed is 400 km/h, and is increased to a higher limiting speed of 405 km/h in a process in which the acceleration prop takes effect, and after the acceleration prop fails, the traveling speed of the virtual vehicle gradually decreases from 405 km/h and returns to 400 km/h. In addition, if the traveling speed of the virtual vehicle does not exceed the original limiting speed associated with the vehicle type, the virtual vehicle continues to move forward at the increased traveling speed.

Any combination of the foregoing optional technical solutions may be used to obtain an optional aspect of the present disclosure. Details are not described herein.

In the method provided in this aspect of this application, A prop storage mechanism in which special effect action is performed to accumulate acceleration energy and an acceleration prop is obtained when the accumulated acceleration energy satisfies a prop addition condition is provided, one acceleration prop is consumed to accelerate a virtual vehicle when a first trigger operation is detected, and in a first period of time after the first trigger operation, if it is detected that a second trigger operation can further consume another acceleration prop, the virtual vehicle is accelerated at a higher acceleration, so that a user can flexibly select, according to a requirement, whether to consume a plurality of acceleration props each time to obtain a higher acceleration, thereby enriching acceleration manners and acceleration effects of the virtual vehicle, making operating policies of acceleration props diversified, helping the user adjust a racing policy based on the virtual vehicle at any time, and improving human-computer interaction efficiency.

In the previous aspect, how does the user consume an acceleration prop through the first trigger operation to perform acceleration and consume another acceleration prop through the second trigger operation to perform acceleration is briefly introduced. In this aspect of this application, a complete acceleration procedure of a virtual vehicle is introduced in detail, and is described below.

Figure 3:
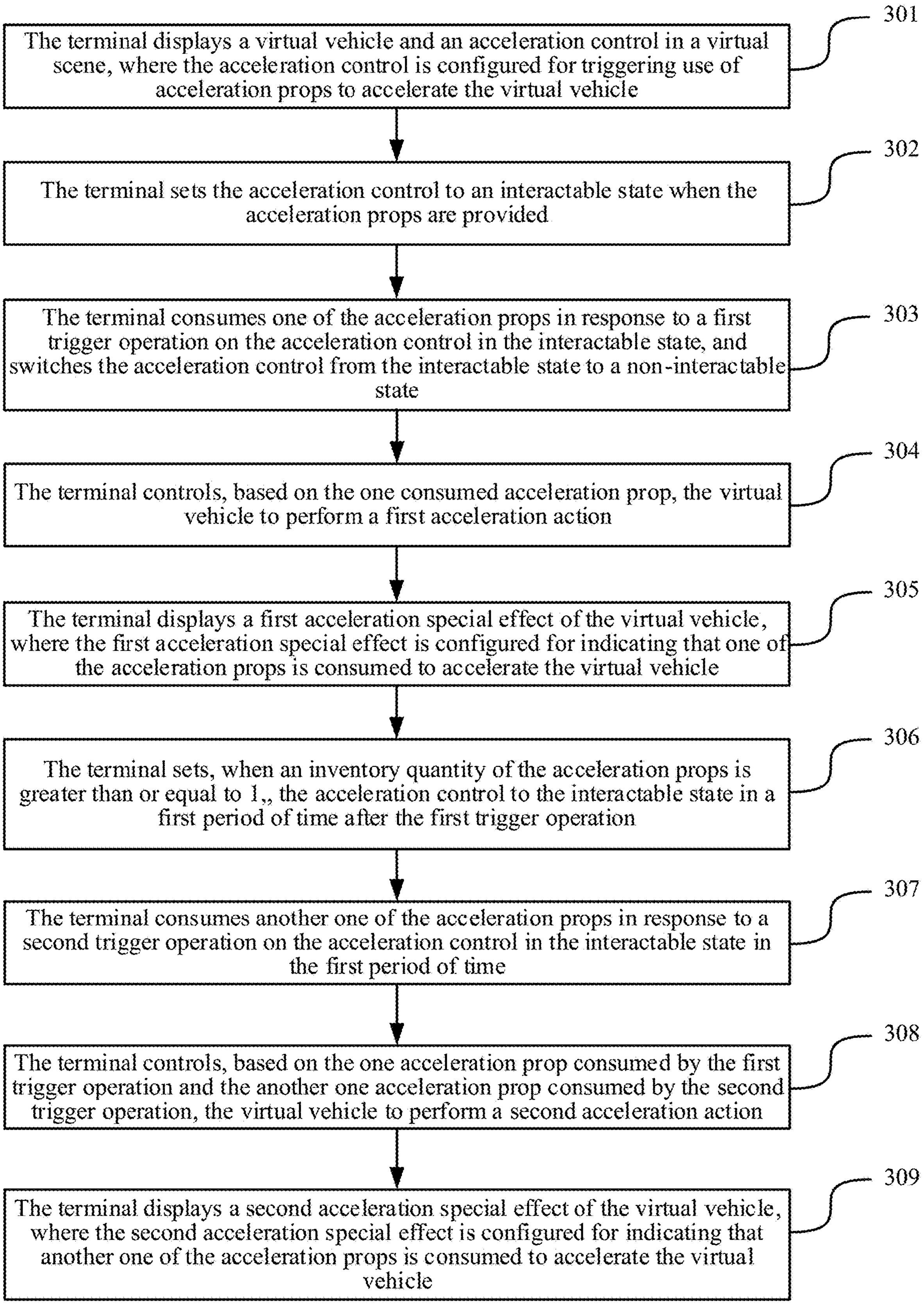
FIG. 3 is a flowchart of a method for controlling a virtual vehicle in a virtual scene according to an aspect of this application.

FIG. 3 is a flowchart of a method for controlling a virtual vehicle in a virtual scene according to an aspect of this application. Referring to FIG. 3, this aspect is performed by an electronic device, and description is made by using an example in which the electronic device is a terminal. The terminal may be the first terminal 120 or the second terminal 160 shown in the foregoing implementation environment, and this aspect includes the following operations:

301. The terminal displays a virtual vehicle and an acceleration control in a virtual scene, where the acceleration control is configured for triggering use of acceleration props to accelerate the virtual vehicle.

In some aspects, after the user starts an application such as a game application on the terminal, a virtual scene is loaded and displayed in the application in response to a round beginning operation performed by the user, and at least a virtual vehicle controlled by the terminal is displayed in the virtual scene. In one aspect, when the user drives the virtual vehicle with a first-person perspective, the virtual vehicle may be displayed only in the virtual scene, to present a game perspective in which the user personally manipulates the virtual vehicle in the virtual scene, to provide the user with an immersive car racing experience. In one aspect, when the user drives the virtual vehicle with a first-person perspective or a third-person perspective, a virtual object located in a driving seat of the virtual vehicle is displayed in the virtual scene, to present a visual effect in which the user drives the virtual vehicle through the virtual object, thereby improving connectivity between the user and the virtual object. The virtual object is configured for representing an image projection of the user in the virtual scene, and the virtual object may be a virtual image that is created and dressed up by the user after logging in to a game account, or may be an initial virtual image associated with a game account. This is not specifically limited in this aspect of this application.

In some aspects, the terminal displays an acceleration control in the virtual scene only when the virtual object or the virtual vehicle is provided with an acceleration prop, and does not display the acceleration control or hides the acceleration control when the virtual object or the virtual vehicle is not provided with any acceleration prop.

In some aspects, regardless of whether the virtual object or the virtual vehicle is provided with an acceleration prop, the acceleration control is displayed. However, the acceleration control is set to the interactable state only when an acceleration prop is provided, and the acceleration control is set to the non-interactable state when no acceleration prop is provided.

In some aspects, the terminal can load, in response to a round beginning operation, a display resource for a virtual scene and an acceleration control from the server, so that the terminal can render, through a game engine, the display resource returned by the server, to display the virtual scene in the application and display the acceleration control in the virtual scene.

A racing car game is used as an example for description. An acceleration prop in the racing car game may be provided as acceleration gas, the acceleration gas usually refers to $N_2O$ used in an NOS system, $N_2O$ may be a rewarding acceleration prop collected by performing a drift operation or another operation in the racing car game, $N_2O$ is configured for achieving an acceleration effect, and $N_2O$ is referred to as "nitrogen" in the racing car game.

Figure 4:
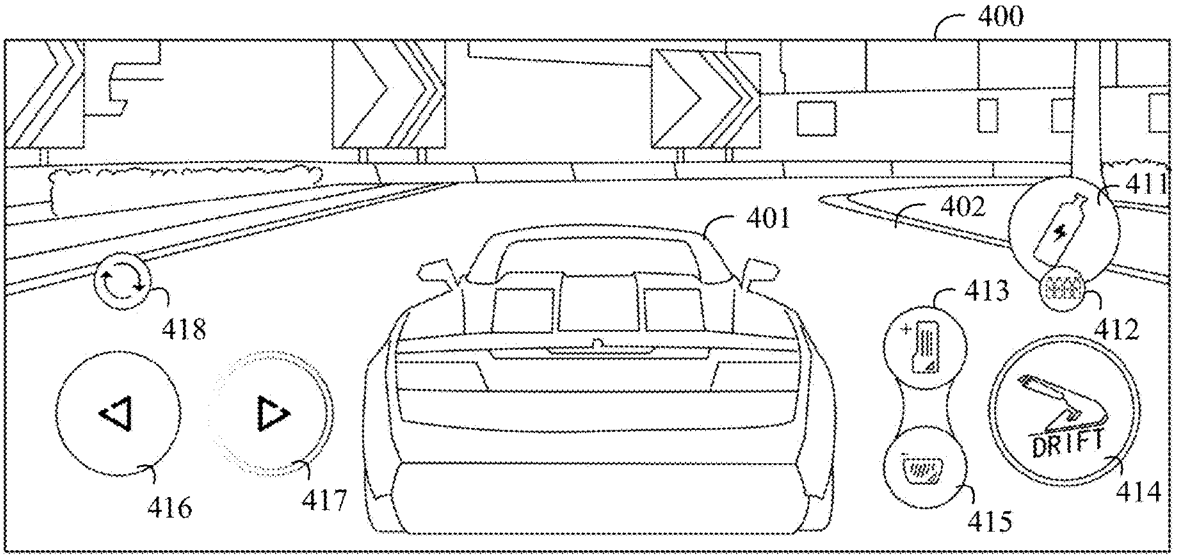
FIG. 4 is a schematic diagram of an interface of a virtual scene of a racing car game according to an aspect of this application.

FIG. 4 is a schematic diagram of an interface of a virtual scene of a racing car game according to an aspect of this application. As shown in FIG. 4, a virtual vehicle 401 and a racing track 402 are displayed in a virtual scene 400, and a user can control the virtual vehicle 401 to travel on the racing track 402. In addition, the virtual scene 400 further includes a nitrogen key 411, a nitrogen count 412, an accelerator key 413, a hand brake key 414, a foot brake key 415, direction keys 416 and 417, and a reset key 418. The nitrogen key 411 is an example of an acceleration control involved in the aspects of this application. Usually, when acceleration props (nitrogen reserves are greater than 0) are provided, one acceleration prop is consumed (that is, one bottle of nitrogen reserves is consumed) by performing a first trigger operation on the nitrogen key 411, to continuously provide the virtual vehicle 401 with an acceleration effect in a next period of time (that is, first acceleration duration). The nitrogen count 412 visually presents the inventory quantity and the inventory capacity of acceleration props in an icon form, that is, visually presents a current nitrogen storage status of the virtual vehicle 401. For example, a gray nitrogen bottle indicates the quantity of nitrogen that can be further stored in the virtual vehicle 401 currently, and a bright nitrogen bottle indicates the quantity of nitrogen that can be used by the virtual vehicle 401 currently. The inventory capacity changes with change the vehicle type and the performance modification. The accelerator key 413 is configured for accelerating the virtual vehicle 401. If the user clicks the accelerator key 413, an accelerator is automatically maintained in a pressed state, to continuously accelerate the virtual vehicle 401. The hand brake key 414 is configured for significantly reducing the traveling speed of the virtual vehicle 401 in a short time. If the user clicks the hand brake key 414, the traveling speed of the virtual vehicle 401 is significantly reduced in a short time. In this case, if the direction key 416 or 417 is pressed together collaboratively, the virtual vehicle 401 is enabled to enter a drift state. The foot brake key 415 is configured for separating from an acceleration state. When the virtual vehicle 401 is in the acceleration state, if the user clicks the foot brake key 415 once, acceleration is stopped; and if the user continuously presses the foot brake key 415, the traveling speed of the virtual vehicle 401 is reduced, until the traveling speed is reduced to 0. In this case, if the user continues to press and hold the foot brake key 415, the virtual vehicle 401 is controlled to reverse backward. The direction key 416 is a left direction key, configured to control the virtual vehicle 401 to turn leftward. The direction key 417 is a right direction key, configured to control the virtual vehicle 401 to turn rightward. In a traveling process of the virtual vehicle 401, the user can control a traveling direction of the virtual vehicle 401 through the direction keys 416 and 417. The reset key 418 is configured for the virtual vehicle 401 to escape from a trap. When the virtual vehicle 401 separates from the racing track or is caught in dead space, if the user clicks the reset key 418, the virtual vehicle 401 can be automatically transferred to a nearby wide road surface and restart.

302. The terminal sets the acceleration control to an interactable state when the acceleration props are provided.

In some aspects, the terminal displays an acceleration control in the virtual scene only when the virtual object or the virtual vehicle is provided with an acceleration prop, and does not display the acceleration control or hides the acceleration control when the virtual object or the virtual vehicle is not provided with any acceleration prop. In some other aspects, regardless of whether the virtual object or the virtual vehicle is provided with an acceleration prop, the acceleration control is displayed. When an acceleration control is displayed in the virtual scene is not specifically limited in this aspect of this application.

In this aspect of this application, description is made by using an example in which the acceleration control is set to the interactable state only when an acceleration prop is provided and the acceleration control is set to the non-interactable state when no acceleration prop is provided. In some aspects, the acceleration control may alternatively be set to the interactable state regardless of whether an acceleration prop is provided. However, a response is made to the detected first trigger operation on the acceleration control only when an acceleration prop is provided; and when no acceleration prop is provided, even if the user performs the first trigger operation on the acceleration control, the terminal still does not make any response.

In some aspects, the terminal displays the acceleration control in the interactable state only when the acceleration control is set to the interactable state, and the terminal hides or does not display the acceleration control in the non-interactable state when the acceleration control is set to the non-interactable state, which can prevent the user from accidentally touching the acceleration control in the non-interactable state. In some other aspects, regardless of whether the acceleration control is in the interactable state, the acceleration control is displayed in the virtual scene, but the acceleration control in different states are distinguished in different display manners.

In some aspects, the terminal sets different display manners for the acceleration control in the interactable state and the acceleration control in the non-interactable state. For example, the acceleration control in the interactable state is displayed in a first display manner, and the acceleration control in the non-interactable state is displayed in a second display manner, so that the user can evidently learn whether the acceleration control is in the interactable state through a display manner of the acceleration control.

In an example, the first display manner is to fill a UI icon of the acceleration control with brightness, to present a light effect of lightening the UI icon, and the second display manner is to fill the UI icon of the acceleration control with no brightness or with relatively dim brightness, to present an effect of maintaining the UI icon in gray or dim brightness.

In another example, the first display manner is to fill the UI icon of the acceleration control with a first color, the second display manner is to fill the UI icon of the acceleration control with a second color, and the second color is different from the first color. For example, the first display manner is to fill the UI icon of the acceleration control with green, and the second display manner is to fill the UI icon of the acceleration control with gray.

Figure 5:
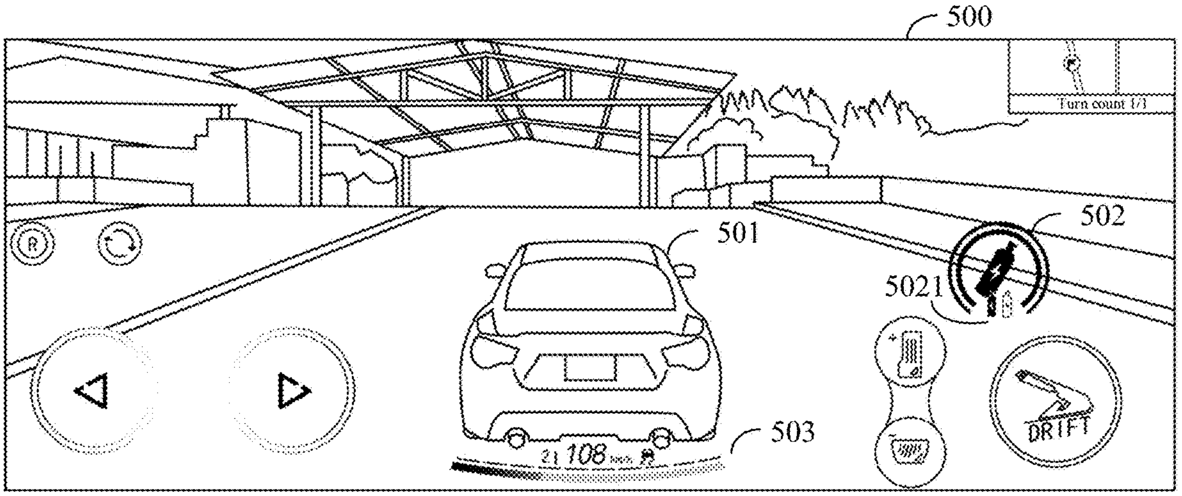
FIG. 5 is a schematic diagram of an interface of a virtual scene according to an aspect of this application.

FIG. 5 is a schematic diagram of an interface of a virtual scene according to an aspect of this application. As shown in FIG. 5, a racing car game is used as an example. Assuming that an acceleration prop is acceleration gas such as nitrogen (referring to $N_2O$ in an NOS system), a virtual vehicle 501 and a nitrogen key 502 are displayed in a virtual scene 500, and the nitrogen key 502 is an example of an acceleration control. In this case, if the inventory capacity of nitrogen is 2 and the inventory quantity of nitrogen is 1, it indicates that a total of two bottles of nitrogen may be stored and one bottle of nitrogen is currently stored. Because available nitrogen is provided (that is, an acceleration prop is provided), the nitrogen key 502 is set to the interactable state. For example, the nitrogen key 502 in the interactable state is displayed with a highlighted effect (the button is in a bright color such as highlighted blue), and the nitrogen key 502 in the non-interactable state is not displayed with a highlighted effect (the button is in gray).

In some aspects, the terminal displays the inventory quantity and the inventory capacity of the acceleration props based on the acceleration control in the virtual scene. The inventory capacity is associated with a vehicle type of the virtual vehicle, and the inventory capacity is configured for indicating a threshold of a quantity of the acceleration props that are allowed by the vehicle type to be stored. The inventory quantity refers to the quantity of currently possessed acceleration props, the inventory quantity is any value greater than or equal to 0 and less than or equal to the inventory capacity, and the inventory capacity is any integer greater than or equal to 1.

In one aspect, if the inventory capacity is associated with only the vehicle type of the virtual vehicle, the terminal may perform query based on the vehicle type to obtain the inventory capacity associated with the vehicle type. In one aspect, for a virtual vehicle of a vehicle type, the user can perform a type of performance modification on the virtual vehicle before round beginning, to increase or reduce the inventory capacity associated with the vehicle type. In this case, the inventory capacity may be determined based on the performance-modified virtual vehicle. A manner of determining the inventory capacity is not specifically limited in this aspect of this application.

In some aspects, the terminal displays the inventory quantity and the inventory capacity in a text form based on the acceleration control. For example, when the inventory quantity is 1 and the inventory capacity is 2, the inventory quantity and the inventory capacity may be hinted through a text of "1/2", or the inventory quantity and the inventory capacity may be hinted through a text of "inventory quantity 1; and inventory capacity 2".

In some aspects, the terminal displays the inventory quantity and the inventory capacity in an icon form based on the acceleration control. An example in which the acceleration prop is acceleration gas $N_2O$ is used. When the inventory quantity is 1 and the inventory capacity is 2, because the inventory capacity is 2, two gas storage bottles are displayed on the acceleration control; and because the inventory quantity is 1, one of the two gas storage bottles displayed on the acceleration control is set to a lightened state or set to a mixed color, and the other gas storage bottle that remains is set to a dim state or set to gray.

Description is made by still using FIG. 5 as an example. Referring to FIG. 5, in the virtual scene 500, a nitrogen count 5021 is further displayed on the nitrogen key 502. For example, the nitrogen count 5021 represents the inventory quantity and the inventory capacity of acceleration props in an icon form. For example, two nitrogen bottles satisfying the inventory capacity of 2 are displayed in FIG. 5, where one black nitrogen bottle and one white nitrogen bottle are provided, the black nitrogen bottle represents a possessed nitrogen bottle whose inventory quantity is 1, and the white nitrogen bottle represents one nitrogen bottle that remains and that is available for storage. Further, in the virtual scene 500, a nitrogen energy progress bar 503 is further displayed. The nitrogen energy progress bar 503 is configured for representing a nitrogen energy value accumulated currently through a drift skill on the virtual vehicle (the nitrogen energy value is an example of an acceleration energy value). As the nitrogen energy value increases, when the nitrogen energy progress bar 503 is filled to a full progress, the virtual vehicle 501 automatically obtains one nitrogen acceleration prop. In this case, the inventory quantity is increased by 1. To be specific, an automatic nitrogen storage mechanism is provided, and after a single bottle of nitrogen is fully collected, a nitrogen acceleration prop is automatically obtained.

In some aspects, regardless of whether the inventory quantity and the inventory capacity are displayed in a text form or an icon form, the inventory quantity and the inventory capacity in the foregoing text form or icon form may be directly displayed on the acceleration control, or the inventory quantity and the inventory capacity in the foregoing text form or icon form may be displayed in a target range around the acceleration control. For example, the target range may be the bottom, the top, the left, or the right. The target range is not specifically limited in this aspect of this application.

In some other aspects, only when the user performs a viewing operation (for example, a press and hold operation) on the acceleration control, the terminal displays, in response to the viewing operation, the inventory quantity and the inventory capacity in the foregoing text form or icon form. In one aspect, the inventory quantity and the inventory capacity in the foregoing text form or icon form are displayed on the acceleration control, or the inventory quantity and the inventory capacity in the foregoing text form or icon form are displayed in a target range around the acceleration control. Display positions of the inventory quantity and the inventory capacity are not specifically limited in this aspect of this application.

In the foregoing process, the inventory quantity and the inventory capacity of acceleration props are displayed based on the acceleration control, that is, the inventory quantity and the inventory capacity of acceleration props are displayed around the acceleration control. In this way, the user does not need to open a virtual packsack to view the inventory quantity and the inventory capacity, which can help the user view such important information as the inventory quantity and the inventory capacity at any time, thereby increasing the amount of information carried in the acceleration control and improving information obtaining efficiency of the user for the inventory quantity and the inventory capacity.

303. The terminal consumes one of the acceleration props in response to a first trigger operation on the acceleration control in the interactable state, and switches the acceleration control from the interactable state to a non-interactable state.

In some aspects, the foregoing first trigger operation on the acceleration control includes but is not limited to: a click operation, a double-click operation, a press operation, a slide operation in a designated direction based on an acceleration control (for example, leftward slide, rightward slide, upward slide, or downward slide), a voice instruction, a gesture instruction, and the like The first trigger operation is not specifically limited in this aspect of this application.

In some aspects, after the first trigger operation performed by the user on the acceleration control in the interactable state is detected, the terminal consumes one acceleration prop, that is, the inventory quantity of acceleration props is reduced by 1. For example, assuming that the inventory quantity of acceleration props is 2, after the first trigger operation on the acceleration control in the interactable state is detected, the inventory quantity of acceleration props is reduced by 1, that is, the inventory quantity is changed from 2 to 1, indicating that one acceleration prop is consumed to accelerate the virtual vehicle, to control the virtual vehicle to perform the first acceleration action.

Figure 6:
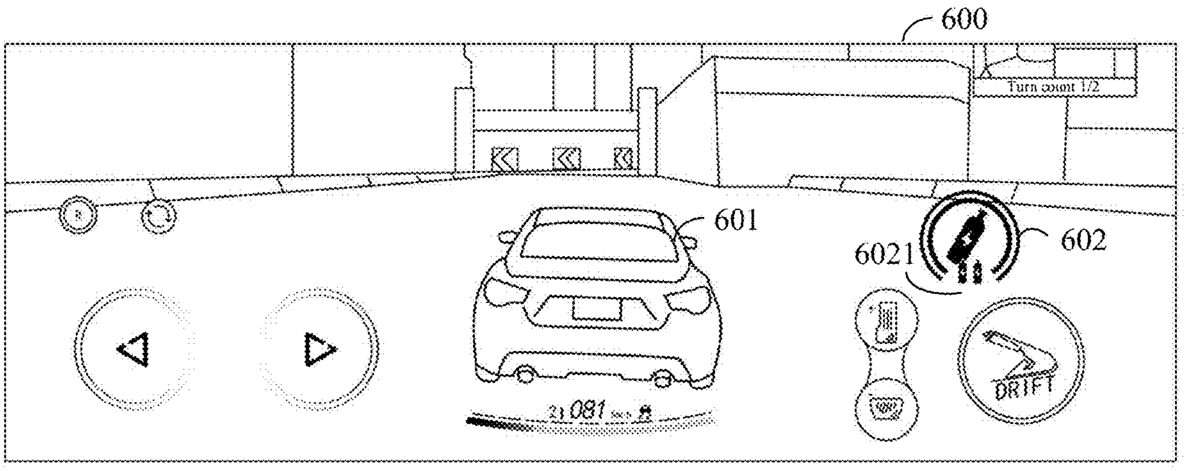
FIG. 6 is a schematic diagram of an interface of a virtual scene according to an aspect of this application.

FIG. 6 is a schematic diagram of an interface of a virtual scene according to an aspect of this application. As shown in FIG. 6, a racing car game is used as an example. Assuming that an acceleration prop is acceleration gas such as nitrogen (referring to $N_2O$ in an NOS system), a virtual vehicle 601 and a nitrogen key 602 are displayed in a virtual scene 600, and the nitrogen key 602 is an example of an acceleration control. In this case, if the inventory capacity of nitrogen is 2 and the inventory quantity of nitrogen is 2, it indicates that a total of two bottles of nitrogen may be stored and two bottles of nitrogen are currently stored. Because available nitrogen is provided (that is, an acceleration prop is provided), the nitrogen key 602 is set to the interactable state. Further, a nitrogen count 6021 is further displayed on the nitrogen key 602. For example, the nitrogen count 6021 represents the inventory quantity and the inventory capacity of acceleration props in an icon form. For example, two black nitrogen bottles are displayed in FIG. 6, indicating that the current inventory quantity reaches the inventory capacity. The user may perform a first trigger operation on the nitrogen key 602. For example, the user clicks the nitrogen key 602, to consume one bottle of inventory nitrogen, and accelerates the virtual vehicle 601 through the one bottle of consumed nitrogen, to control the virtual vehicle 601 to perform a first acceleration action. In this case, the inventory capacity of nitrogen is still 2, but the inventory quantity is changed from 2 to 1.

In some aspects, when the inventory quantity of acceleration props is further displayed on the acceleration control, because the inventory quantity is changed to a value obtained by subtracting 1 from the original value, and the value that is obtained by subtracting 1 from the original value and to which the inventory quantity is changed from the original value further needs to be displayed on the acceleration control. For example, before the user performs the first trigger operation on the acceleration control, a text of "2/2" is displayed on the acceleration control, representing the inventory quantity of 2 and the inventory capacity of 2; and after the user performs the first trigger operation on the acceleration control, because one acceleration prop is consumed, a text of "1/2" is displayed on the acceleration control, representing the inventory quantity of 1 and the inventory capacity of 2. In another example, before the user performs the first trigger operation on the acceleration control, two bright gas storage bottles are displayed on the acceleration control; and after the user performs the first trigger operation on the acceleration control, one bright gas storage bottle and one dark gas storage bottle are displayed on the acceleration control.

In the foregoing process, the inventory quantity of displayed on the acceleration control is updated in time, which can provide the user with a visual UI change effect of consuming one acceleration prop to accelerate the virtual vehicle in response to the first trigger operation on the acceleration control, thereby deepening visual feedback on the first trigger operation, increasing the amount of information carried in the acceleration control, and optimizing the user experience.

In some aspects, the terminal may further play a first trigger special effect of the acceleration control in the interactable state in response to the first trigger operation on the acceleration control, where the first trigger special effect is configured for hinting that one of the acceleration props is consumed to accelerate the virtual vehicle. For example, the first trigger special effect is an aperture special effect dispersing around the acceleration control, and the aperture special effect gradually fades out as the aperture radius expands. In another example, the first trigger special effect includes an aperture special effect and hinting information for a change in the inventory quantity. For example, the hinting information is "inventory −1", or the hinting information is "accelerating". The content of the first trigger special effect is not specifically limited in this aspect of this application.

In one aspect, the foregoing first trigger special effect includes: at least one of an animation, a dynamic effect, a moving picture, a picture, a text, a particle special effect, and a magic expression. The representation form of the first trigger special effect is not specifically limited in this aspect of this application.

Figure 7:
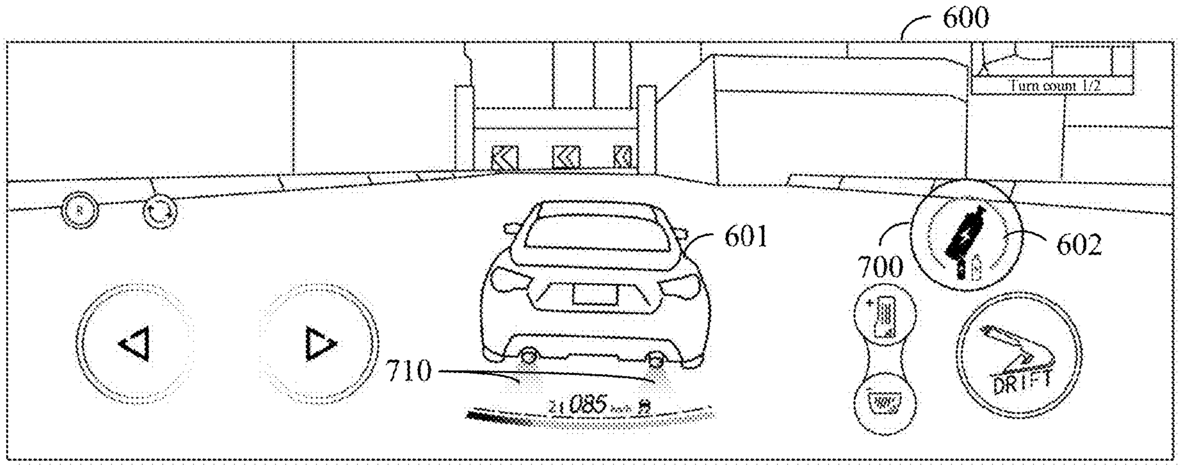
FIG. 7 is a schematic diagram of an interface of a virtual scene according to an aspect of this application.

FIG. 7 is a schematic diagram of an interface of a virtual scene according to an aspect of this application. As shown in FIG. 7, description continues to be made based on the example provided in FIG. 6. When two bottles of nitrogen are stored, the user clicks the nitrogen key 602, to consume one bottle of inventory nitrogen, and accelerates the virtual vehicle 601 through the one bottle of consumed nitrogen. In this case, the inventory capacity of nitrogen is still 2, but the inventory quantity is changed from 2 to 1. Therefore, it can be seen that, before the user clicks the nitrogen key 602, the two black nitrogen bottles displayed in the virtual scene 600 is changed, because of a change in the inventory quantity, to one black nitrogen bottle and one white nitrogen bottle after the user clicks the nitrogen key 602, and therefore the change in the inventory quantity can be visually fed back in real time. In addition, in the virtual scene 600, a first trigger special effect 700 of the nitrogen key 602 is further displayed. The first trigger special effect 700 is an aperture special effect dispersing around the nitrogen key 602, and the aperture special effect gradually fades out as the aperture radius expands, to help the user learn in time that the current first trigger operation is detected by the terminal.

In the foregoing process, by playing the first trigger special effect of the acceleration control, a visual special effect for visual interaction feedback can be played for the first trigger operation performed by the user, so that the user learns in time that the current first trigger operation is detected by the terminal, and accelerates the virtual vehicle through one consumed acceleration prop, to control the virtual vehicle to perform the first acceleration action, which can avoid a case that the user does not know whether the terminal detects the first trigger operation, and therefore repeatedly performs the first trigger operation on the acceleration control, thereby improving human-computer interaction efficiency.

In some aspects, in addition to consuming acceleration props and displaying the first trigger special effect, if the inventory quantity of acceleration props is still greater than or equal to 1 after one acceleration prop is consumed, the terminal can still maintain the acceleration control in the interactable state, so that the user performs the second trigger operation on the acceleration control in the interactable state again, to consume a plurality of acceleration props at a time to provide an acceleration function; or if the inventory quantity of acceleration props is less than 1 after one acceleration prop is consumed, the terminal can switch the acceleration control from the interactable state to the non-interactable state. In this way, equivalently, when the remaining inventory quantity is less than 1, the acceleration control is directly set to the non-interactable state, to avoid a case that after the user accidentally touches the acceleration control, the terminal wastes resources in detecting whether the accidental touch is the first trigger operation and whether an acceleration prop is possessed to perform acceleration, thereby saving computing resources of the terminal.

In some aspects, after detecting the first trigger operation performed by the user on the acceleration control, in addition to consuming acceleration props and displaying the first trigger special effect, the terminal may further directly switch the acceleration control from the interactable state to the non-interactable state. Further, only in the first period of time after the virtual vehicle is accelerated based on one of the acceleration props, the acceleration control is switched from the non-interactable state back to the interactable state, so that the user performs the second trigger operation on the acceleration control in the interactable state in the first period of time. To be specific, after performing the first trigger operation on the acceleration control, regardless of whether the remaining inventory quantity is less than 1, the user switches the acceleration control from the interactable state to the non-interactable state, which can reduce, by directly setting the acceleration control to the non-interactable state, a probability that the user accidentally touches the acceleration control in a short time after performing the first trigger operation, to avoid occurrence of such a case that a plurality of acceleration props are consumed because accidental touch is recognized as the second trigger operation when it is originally not intended that a plurality of acceleration props are consumed, reduce an accidental touch rate for the acceleration control, and optimize the user experience.

In one aspect, switching the acceleration control to the interactable state again only in the first period of time can remind the user that the user can perform the second trigger operation on the acceleration control in the current first period of time, to trigger a second acceleration action faster than the first acceleration action, thereby preventing the user from missing a better acceleration effect.

304. The terminal controls, based on the one consumed acceleration prop, the virtual vehicle to perform a first acceleration action.

In some aspects, because the first trigger operation consumes one acceleration prop, the terminal first accelerates the virtual vehicle through one acceleration prop, to control the virtual vehicle to perform the first acceleration action. For how to accelerate the virtual vehicle through one acceleration prop, reference may be made to description of operation 203 in the previous aspect.

In this aspect of this application, referring to the following operations 3041 to 3043, a possible implementation of controlling the virtual vehicle to perform the first acceleration action through one consumed acceleration prop is shown. Acceleration logic of one acceleration prop is described below using an example in which one acceleration prop not only applies an acceleration to the virtual vehicle but also increases the limiting speed of the virtual vehicle.

3041. The terminal determines a first acceleration and a first speed increment that are associated with the acceleration prop.

The first acceleration refers to an acceleration that a single acceleration prop can provide, and the first acceleration is any value greater than 0. For example, the first acceleration is 10 km/h/s.

The first speed increment refers to a speed increment that a single acceleration prop can provide to the limiting speed of the virtual vehicle, and the first speed increment is any value greater than 0. For example, the first speed increment is 20 km/h.

In some aspects, in a stage of loading the virtual scene before or after a round of the game begins, the terminal locally downloads prop parameter information of the acceleration prop in advance. The prop parameter information includes a first acceleration and a first speed increment that are associated with the acceleration prop. In one aspect, the prop parameter information further includes a second acceleration and a second speed increment that are involved in the following operation 3081. In one aspect, the prop parameter information further includes a first speed difference involved in the following operation 3043 and a second speed difference involved in the following operation 3084.

In some aspects, the terminal stores a prop identifier of the acceleration prop and the prop parameter information associatively. In an example, the prop identifier being an index and the prop parameter information being index content are associatively stored. For example, the prop identifier used as a Key (key name) and the prop parameter information used as a Value (key value) form a Key-Value data structure and are associatively stored. In another example, assuming that a plurality of different acceleration props are set in the virtual scene, each acceleration prop and its prop parameter information can be associatively stored in one hash table. The associative storage manner is not specifically limited in this aspect of this application.

When the prop identifier of the acceleration prop and the prop parameter information are locally stored associatively, the terminal locally performs, by using the prop identifier of the acceleration prop as an index, query to obtain the prop parameter information stored associatively with the index, and obtain the first acceleration and the first speed increment from the prop parameter information. In this way, overheads of one round of communication between the terminal and the server can be saved.

In some other aspects, the terminal sends one query request configured for obtaining the first acceleration and the first speed increment to the server, and the query request carries at least the prop identifier of the acceleration prop, so that the server side performs, by using the prop identifier of the acceleration prop as an index, query to obtain the first acceleration and the first speed increment that are stored associatively with the index, and returns the first acceleration and the first speed increment that are obtained through query to the terminal. In this case, the terminal does not need to locally use internal memory to maintain the prop parameter information, thereby saving storage overheads of the terminal.

3042. The terminal determines a first speed threshold of the virtual vehicle based on a limiting speed associated with the virtual vehicle and the first speed increment.

In some aspects, the terminal determines a limiting speed associated with the virtual vehicle, this limiting speed is associated with a vehicle type of the virtual vehicle, and the terminal performs query based on the vehicle type to obtain the limiting speed associated with the vehicle type.

In some other aspects, for a virtual vehicle of a vehicle type, the user can perform a type of performance modification on the virtual vehicle before round beginning, to increase or reduce the limiting speed associated with the vehicle type. In this case, the limiting speed may be determined based on the performance-modified virtual vehicle. A manner of determining the limiting speed is not specifically limited in this aspect of this application.

In some aspects, after determining a limiting speed of the virtual vehicle, the terminal adds the limiting speed to the first speed increment obtained in the foregoing operation 3041, to obtain the first speed threshold. The first speed threshold refers to a maximum speed at which the virtual vehicle is allowed to travel in first acceleration duration in which a single acceleration prop takes effect, and represents a maximum traveling speed in the first acceleration duration (that is, an upper limit of the traveling speed). An increase in the limiting speed by a single acceleration prop is time-bound. Only in the first acceleration duration in which a single acceleration prop takes effect, the limiting speed can be increased to the first speed threshold. After a single acceleration prop fails (that is, after the first acceleration duration expires), the maximum traveling speed of the virtual vehicle is reduced from the first speed threshold back to the original limiting speed.

3043. The terminal controls, based on the first acceleration associated with the acceleration prop, the virtual vehicle to perform the first acceleration action, where the traveling speed of the virtual vehicle performing the first acceleration action does not exceed the first speed threshold.

The first speed threshold is determined based on the limiting speed associated with the virtual vehicle and the first speed increment associated with the acceleration prop, and the first acceleration increment is an acceleration by which a single acceleration prop can increase based on the limiting speed.

In some aspects, the terminal always performs uniform acceleration on the virtual vehicle at the first acceleration, that is, controls the virtual vehicle to perform a uniform acceleration action at the first acceleration, and not to perform acceleration anymore when the traveling speed of the virtual vehicle reaches the first speed threshold (the acceleration is set from the first acceleration to 0). If the initial speed of the virtual vehicle is low, it is very possible that after the first acceleration duration, the virtual vehicle still cannot be accelerated to the first speed threshold, equivalently, the virtual vehicle continuously performs uniform acceleration in the first acceleration duration. In this way, acceleration logic of the virtual vehicle can be simplified, and calculation overheads of the terminal can be saved.

In some aspects, an acceleration manner of first performing uniform acceleration and then perform non-uniform acceleration is provided, and is as follows: A first speed difference associated with the acceleration prop is obtained. The first speed difference refers to a parameter configured for controlling when to switch from uniform acceleration to non-uniform acceleration. When a speed difference between the traveling speed of the virtual vehicle and the first speed threshold reaches the first speed difference, switching from uniform acceleration to non-uniform acceleration is made. In one aspect, the first speed difference is one item in the prop parameter information of the acceleration prop, is obtained through the foregoing operation 3041 at any time, and does not need to be obtained once alone; or the terminal to the server sends a query request configured for obtaining the first speed difference, and the server returns the first speed difference obtained through query to the terminal. Details are not described herein. Then, when a difference between the traveling speed of the virtual vehicle and the first speed threshold is greater than the first speed difference, uniform acceleration is performed on the virtual vehicle at the first acceleration, that is, the virtual vehicle is controlled to perform a uniform acceleration action at the first acceleration. The uniform acceleration refers to an acceleration process in which the acceleration is constant (equal to the first acceleration). In other words, when a value obtained by subtracting the traveling speed of the virtual vehicle from the first speed threshold is greater than the first speed difference, uniform acceleration is always performed on the virtual vehicle at the first acceleration. For example, when uniform acceleration is performed at the first acceleration of 10 km/h/s, the traveling speed is increased by 10 km/h per second. Then, when a difference between the traveling speed of the virtual vehicle and the first speed threshold is less than or equal to the first speed difference, non-uniform acceleration is performed on the virtual vehicle at a first variable acceleration obtained based on attenuation of the first acceleration, that is, the virtual vehicle is controlled to perform a non-uniform acceleration action at the first variable acceleration. Because the first variable acceleration is obtained from attenuation of the first acceleration, the value of the first variable acceleration does not exceed that of the first acceleration. In addition, the non-uniform acceleration refers to an acceleration process in which the acceleration is changed (that is, the value of the first variable acceleration is dynamically changed, and is increasingly small, but is not a fixed value). In other words, when a value obtained by subtracting the traveling speed of the virtual vehicle from the first speed threshold is less than or equal to the first speed difference, the terminal determines a first variable acceleration obtained based on attenuation of the first acceleration, and performs non-uniform acceleration on the virtual vehicle at the first variable acceleration.

In the foregoing process, an acceleration manner of first performing uniform acceleration and then perform non-uniform acceleration is provided, so that when the difference between the traveling speed and the first speed threshold (refers to the increased limiting speed) is large, uniform acceleration is performed at the first acceleration, that is, the virtual vehicle is stably and quickly accelerated; and when the difference between the traveling speed and the first speed threshold is small, an effect of speeding up the virtual vehicle but gradually attenuating the speed increment is maintained through the first variable acceleration obtained from attenuation of the first acceleration. Equivalently, when the traveling speed is closer to the first speed threshold, impact of attenuation of the first variable acceleration on the speed increment is increasingly small, to achieve a transitional effect of gradually and gently increasing to the first speed threshold, and prevent the acceleration from being sharply reduced from the first acceleration to 0 when the first speed threshold is reached, which can simulate a driving experience in the real world that the speed increment is increasingly gentle if the vehicle is close to the limiting speed during acceleration, thereby helping providing the user with an immersive driving atmosphere.

In some aspects, a possible attenuation manner of the first variable acceleration is provided: the first variable acceleration is obtained by linearly attenuating the first acceleration as an initial acceleration according to non-uniform acceleration duration of the virtual vehicle; and when a traveling speed of the virtual vehicle reaches the first speed threshold, the first variable acceleration is just attenuated to 0. In other words, the first variable acceleration is linearly attenuated from the first acceleration, and when the traveling speed of the virtual vehicle can be increased to the first speed threshold in the first acceleration duration, the first variable acceleration is just attenuated to 0. If the traveling speed of the virtual vehicle cannot be increased to the first speed threshold in the first acceleration duration in which the acceleration prop takes effect, it is very possible that the first variable acceleration is not attenuated to 0 even when the acceleration prop fails. For example, when the first acceleration is 20 km/h/s, the first speed threshold is 400 km/h, and the first speed difference is 200 km/h, assuming that the traveling speed of the virtual vehicle is increased to 200 km/h with a difference just equal to the first speed difference 200 km/h from the first speed threshold 400 km/h at a moment in the first acceleration duration, if the traveling speed of the virtual vehicle cannot be increased, in such a stage from the beginning of a moment to the end of the first acceleration duration, from 200 km/h to 400 km/h at the first variable acceleration obtained from attenuation of 20 km/h/s, the first variable acceleration is not attenuated to 0 finally; if the traveling speed of the virtual vehicle can be increased, in such a stage from the beginning of a moment to the end of the first acceleration duration, from 200 km/h to 400 km/h at the first variable acceleration, the first variable acceleration is just attenuated to 0 when the traveling speed of the virtual vehicle reaches 400 km/h; and then if the first acceleration duration still does not end, the virtual vehicle performs uniform-speed traveling at the first speed threshold 400 km/h (if the first variable acceleration is 0, it indicates that the virtual vehicle does not continue to accelerate anymore).

In some aspects, in a process in which the first variable acceleration is obtained by linearly attenuating the first acceleration as an initial acceleration according to non-uniform acceleration duration of the virtual vehicle, the first acceleration may be used as the initial acceleration, and the initial acceleration is reduced by a specific attenuation amount in each second, or the initial acceleration is reduced by a specific attenuation amount in each frame. The foregoing attenuation amount may be fixed, or may be increasingly large as the non-uniform acceleration duration increases. This is not specifically limited in this aspect of this application.

In some aspects, in addition to obtaining the first variable acceleration according to linear attenuation of the non-uniform acceleration duration of the virtual vehicle, the first variable acceleration may be further obtained according to linear attenuation of the traveling speed of the virtual vehicle. For example, each time the traveling speed is increased by 10 km/h, the first variable acceleration is attenuated by a specific attenuation amount. In another example, the first variable acceleration is attenuated according to a ratio of a speed difference between the current traveling speed and the first speed threshold to the first speed difference. For example, the first variable acceleration is attenuated to 90% of the first acceleration when the foregoing speed difference accounts for 10% of the first speed difference, the first variable acceleration is attenuated to 80% of the first acceleration when the foregoing speed difference accounts for 20% of the first speed difference, and the rest can be deduced by analog. An attenuation manner of the first variable acceleration is not specifically limited in this aspect of this application.

Assuming that in the first acceleration duration in which the acceleration prop takes effect, an excessively small initial speed of the virtual vehicle causes the difference between the traveling speed of the virtual vehicle and the first speed threshold to be still greater than the first speed difference after acceleration is finally completed, uniform acceleration is performed on the virtual vehicle continuously in the first acceleration duration, that is, the virtual vehicle is controlled in the first acceleration duration to continuously perform a uniform acceleration action at the first acceleration, and switching from uniform acceleration to non-uniform acceleration does not occur.

For example, the first acceleration duration is 3 seconds, the first acceleration is 10 km/h/s, the first speed threshold is 400 km/h, and the first speed difference is 200 km/h. Evidently, a traveling speed with a difference just equal to the first speed difference 200 km/h from the first speed threshold 400 km/h is 200 km/h. In an example, the initial speed of the virtual vehicle is 100 km/h, and if the traveling speed is increased to 130 km/h after 3 seconds, that is, the traveling speed is still not increased to 200 km/h after the acceleration props are exhausted, uniform acceleration is performed continuously on the virtual vehicle in 3 seconds. In another example, if the initial speed of the virtual vehicle is 190 km/h, the traveling speed is increased to 200 km/h in the 1st second. In this case, uniform acceleration is performed on the virtual vehicle at the first acceleration 10 km/h in the 1st second (a speed amount increased in each frame is also uniform in the 1st second). In the 2nd second to the 3rd second, switching from uniform acceleration to non-uniform acceleration is made, and the acceleration of the non-uniform acceleration is the first variable acceleration. For example, the first variable acceleration is gradually linearly attenuated from the first acceleration 10 km/h as time goes by. For example, the first variable acceleration is 9 km/h in the 2nd second, and the first variable acceleration is 8 km/h in the 3rd second. Only a manner in which the first variable acceleration is linearly attenuated as time goes by is used as an example herein. An attenuation manner of the first variable acceleration is not specifically limited in this aspect of this application.

The acceleration logic of the foregoing operations 3041 to 3043 may be executed by the terminal locally, to save communication overheads of the terminal, or the server may execute the acceleration logic and then deliver the traveling speed calculated frame by frame to the terminal, to save calculation overheads of the terminal. Whether the acceleration logic is executed by the terminal locally or executed by the server is not specifically limited in this aspect of this application.

The foregoing operations 3041 to 3043 involve a possible implementation of accelerating the virtual vehicle through one consumed acceleration prop, to control the virtual vehicle to perform the first acceleration action. Because the first acceleration can continuously accelerate the virtual vehicle, and the first speed increment can increase the limiting speed for the virtual vehicle, both the traveling speed and the limiting speed of the virtual vehicle can be increased by consuming one acceleration prop, and the virtual vehicle can be provided with a better acceleration effect, to bring a better acceleration experience for the user.

The foregoing operations 302 to 304 provide a possible implementation of consuming, when at least two acceleration props are provided, one of the acceleration props in response to a first trigger operation on an acceleration control, and accelerating the virtual vehicle, to control the virtual vehicle to perform a first acceleration action. In one aspect, as described in operation 203 in the previous aspect, a single acceleration prop may alternatively increase only the traveling speed of the virtual vehicle, but does not increase the limiting speed of the virtual vehicle. An acceleration manner of a single acceleration prop is not specifically limited in the aspects of this application.

305. The terminal displays a first acceleration special effect of the virtual vehicle, where the first acceleration special effect is configured for indicating that one of the acceleration props is consumed to accelerate the virtual vehicle.

In some aspects, the terminal further displays the first acceleration special effect of the virtual vehicle based on the virtual vehicle in response to the first trigger operation on the acceleration control, and the first acceleration special effect can be displayed around the virtual vehicle. In one aspect, the foregoing first acceleration special effect includes: at least one of an animation, a dynamic effect, a moving picture, a picture, a text, a particle special effect, and a magic expression. The representation form of the first acceleration special effect is not specifically limited in this aspect of this application.

In some aspects, the display resource of the foregoing first acceleration special effect may be loaded locally from the server in advance after round beginning, or may be pulled locally from the server in real time in response to the first trigger operation performed by the user on the acceleration control. The pull occasion of the first acceleration special effect is not specifically limited in this aspect of this application.

For example, description is made by using an example in which the first trigger operation performed by the user on the acceleration control is a click operation, the first trigger special effect of the acceleration control is an aperture special effect, and the first acceleration special effect is a tail gas ejecting special effect on the virtual vehicle. After clicking the acceleration control in the interactable state for the first time, the user plays the aperture special effect based on the acceleration control, indicating that the click performed by the user successfully consumes one acceleration prop, and then the tail gas ejecting special effect is displayed based on an exhaust pipe under the vehicle body of the virtual vehicle, indicating that the one consumed acceleration prop begins to have an acceleration effect.

Description is made by still using FIG. 7 as an example. Referring to FIG. 7, in the virtual scene 600, a first acceleration special effect 710 is further displayed near an exhaust pipe under the vehicle body of the virtual vehicle 601. For example, the first acceleration special effect 710 is provided as a tail gas ejecting special effect, and is configured for simulating an effect of injecting liquid nitrogen oxide $N_2O$ into an engine by using the principle of the NOS system in a real world, to instantaneously provide the virtual vehicle 601 with an instantaneously increased high horsepower and then exhaust tail gas through the exhaust pipe. The first acceleration special effect 710 can improve simulation fidelity of the racing car game, and can help provide the user with an immersive experience.

In the foregoing process, by displaying the first acceleration special effect, the user can be reminded in time that the virtual vehicle is provided with an acceleration effect through one consumed acceleration prop in response to the first trigger operation, thereby hinting the amount of information carried in the virtual scene, bringing a richer visual feedback, and optimizing the user experience.

306. The terminal sets, when an inventory quantity of the acceleration props is greater than or equal to 1, the acceleration control to the interactable state in a first period of time after the first trigger operation.

The first period of time later than the time when the user performs the first trigger operation on the acceleration control, and both a start moment and an end moment the first period of time are earlier than an end moment of first acceleration duration of a single acceleration prop. In other words, the first period of time refers to a subset of any period of time that is later than the time when the user performs a trigger operation on the acceleration control and that is in first acceleration duration of a single acceleration prop, that is, duration of the first period of time is less than the first acceleration duration. For example, when the first acceleration duration is 5 seconds, the first period of time may be in first 0.3 seconds to 1 second in the 5 seconds (that is, be in 0.3 seconds to 1 second after the user performs the first trigger operation).

In some aspects, after one acceleration prop is consumed through the first trigger operation, assuming that the inventory quantity of acceleration props is still greater than or equal to 1, the user can be provided with an interaction manner of consuming one (or more) other acceleration prop again, and therefore the virtual vehicle can be provided with a more powerful acceleration effect based on a total of two (or more) acceleration props consumed by two trigger operations with reference to one acceleration prop consumed by the first trigger operation in the foregoing operation 303. Assuming that the user has a plurality of acceleration props before performing the first trigger operation, after the first trigger operation is performed to consume one acceleration prop, one or more acceleration props further remain inevitably. In this case, the acceleration control is inevitably set to the interactable state again in the first period of time, to help the user make a decision about whether to perform the second trigger operation.

In some aspects, the terminal switches, after detecting the first trigger operation performed by the user on the acceleration control, the acceleration control from the interactable state to the non-interactable state, and then switches, when detecting that it is in the first period of time, the acceleration control from the non-interactable state to the interactable state. In this way, in any period of time that is not the first period of time in the first acceleration duration, the acceleration control is in the non-interactable state, which can dramatically avoid an accidental touch operation of the user, reduce a frequency with which the user originally does not intend to use a plurality of acceleration props at a time but an operation error occurs because of accidental touch, reduce an accidental touch rate of the user for the acceleration control, optimize the operation experience of the user, and improve human-computer interaction efficiency.

Figure 8:
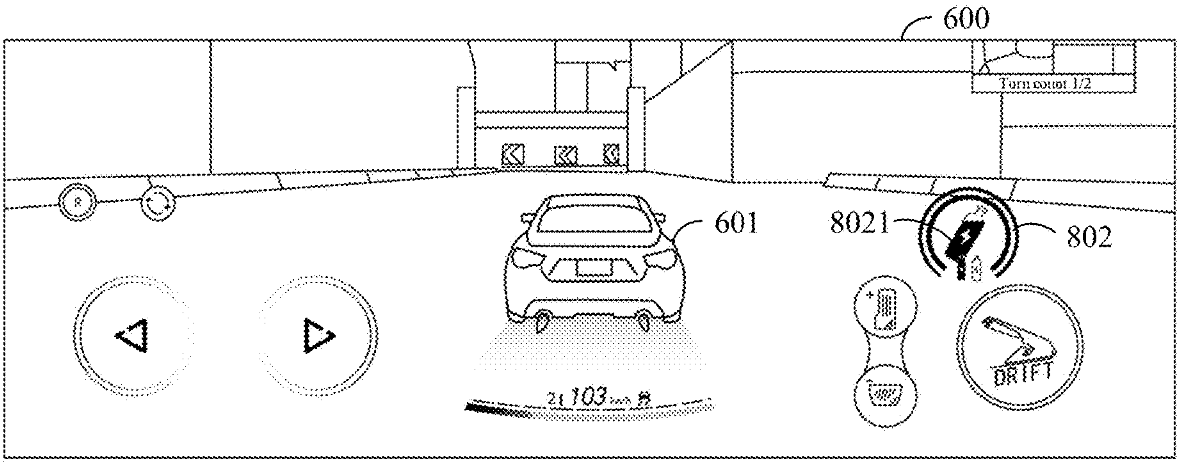
FIG. 8 is a schematic diagram of an interface of a virtual scene according to an aspect of this application.

FIG. 8 is a schematic diagram of an interface of a virtual scene according to an aspect of this application. As shown in FIG. 8, description continues to be made based on FIG. 6 and FIG. 7. Assuming that the first period of time is in 0.3 seconds to 1 second after the user clicks the nitrogen key 602 for the first time, the nitrogen key 602 (that is, the acceleration control) is set to the interactable state again in 0.3 seconds to 1 second after the user clicks the nitrogen key 602 for the first time. It can be seen that, compared with the nitrogen key 602 in the non-interactable state in FIG. 7, the edge of a nitrogen key 802 in the interactable state in FIG. 8 is thickened. In one aspect, the nitrogen key 602 in the interactable state in the previous operation 302 and the nitrogen key 802 in the interactable state in this operation 306 have the same display manner or different display manners. For example, the nitrogen key 602 in the interactable state in the previous operation 302 is provided with a blue highlighted special effect, and the nitrogen key 802 in the interactable state in this operation 306 is provided with a purple highlighted special effect. This is not specifically limited in this aspect of this application.

In the foregoing process, only by setting the acceleration control to the interactable state only in the first period of time, to cause the user to perform the second trigger operation on the acceleration control in the interactable state only in the first period of time, the following operation 307 can be performed. This process may be considered as setting a quick time event (QTE) in the first period of time for the user based on the acceleration control. The QTE refers to a playing method in which the user needs to perform a corresponding correct operation (perform the second trigger operation on the acceleration control) according to an instruction on the screen in a limited time (that is, the first period of time) in a game process, the game performs determination on the operation performed by the user, and successful determination and unsuccessful determination bring different feedback results. For example, when it is determined that the operation is the second trigger operation, indicating that the operation is successful, the following operation 307 is performed; and when it is determined that the operation is not the second trigger operation, indicating that the operation is unsuccessful, the user misses the QTE, and cannot consume a plurality of acceleration props in the current acceleration to achieve a more powerful acceleration effect. By setting the QTE, the user can be urged to focus on interacting with the acceleration control in the first period of time, to trigger consumption of an additional acceleration prop again, so that manners of interaction between the user and the acceleration control are richer and more diversified, thereby increasing interestingness of the user in the interaction process.

In some aspects, when still detecting that the inventory quantity of the acceleration props is greater than or equal to 1 after the first trigger operation consumes an acceleration prop, the terminal may alternatively set the acceleration control to the interactable state. To be specific, the first period of time is not set for the acceleration prop, and as long as the inventory quantity is still greater than or equal to 1 after a single acceleration prop is consumed completely, the acceleration control is set to the interactable state, so that some users at high levels can quickly and continuously use a plurality of acceleration props through operation skills to accelerate the virtual vehicle, thereby optimizing upper limits of operations performed by the users.

In some aspects, because the first period of time is usually a period of short time, the terminal can display an interaction counting control based on the acceleration control in the first period of time. The interaction counting control is configured for displaying counting information for the first period of time. In other words, the interaction counting control is actually configured for hinting counting information from a start moment of the first period of time to an end moment of the first period of time. In other words, the interaction counting control is configured for hinting counting information indicating that the acceleration control switches from the interactable state to the non-interactable state. In one aspect, the interaction counting control is a count-up control or a count-down control for the first period of time. For example, the count-up control or count-down control may be a bar-shaped progress bar, a ring-shaped progress bar, or a fan-shaped progress bar, or the count-up control or count-down control may be a counting text or counting special effect updated in real time. This is not specifically limited in this aspect of this application.

For example, when the acceleration control is a circular control, the interaction counting control may be a ring-shaped progress bar around an outer ring of the acceleration control. The ring-shaped progress bar is gradually shrunk in progress from a full progress, and is the full progress at the start moment of the first period of time and a zero progress at the end moment of the first period of time, and therefore can be used as the interaction counting control in the form of the ring-shaped progress bar. In one aspect, in a progress change process of the ring-shaped progress bar, a spark special effect of some progress changes may be further presented, to highlight urgency of the first period of time of the QTE.

In the foregoing process, the interaction counting control is displayed, to visually remind the user of how long is left before the end of the first period of time of the QTE, thereby increasing the amount of information carried in the virtual scene, and improving information obtaining efficiency of the user.

In some aspects, when the acceleration prop is acceleration gas, because first acceleration duration of the acceleration gas depends on the remaining gas storage capacity of the acceleration gas, the first acceleration duration actually refers to a consumed time of the acceleration gas in the gas storage bottle from the gas storage capacity to completed consumption, and the terminal can display, based on the acceleration control in response to the first trigger operation on the acceleration control, consumption progress information of the acceleration gas that the acceleration prop can provide, where the consumption progress information is configured for hinting a remaining gas storage capacity of the acceleration gas. The consumption progress information of the acceleration gas actually represents counting information for the first acceleration duration, and is different the counting information for the first period of time represented by the foregoing interaction counting control.

In some aspects, the terminal displays the consumption progress information of the acceleration gas on the acceleration control, or the terminal displays the consumption progress information in a target range around the acceleration control, where the target range refers to the top, the bottom, the left, or the right of the acceleration control. The target range is not specifically limited in this aspect of this application. In an example, the consumption progress information is provided as a progress-variable gas storage bottle displayed on the acceleration control, and a progress displayed on the gas storage bottle represents a remaining gas storage capacity of the gas storage bottle. As the time of the first acceleration duration goes by, if the remaining gas storage capacity of the acceleration gas is increasingly small, the progress of the remaining gas storage capacity displayed based on the gas storage bottle is also increasingly low, and therefore the whole consumption procedure of the acceleration gas can be reflected visually and vividly.

Description is made by still using FIG. 8 as an example. Referring to FIG. 8, consumption progress information of acceleration gas is further displayed in the center of the circular nitrogen key 802, and is referred to as a nitrogen consumption progress icon 8021, and the nitrogen consumption progress icon 8021 includes a black filling part and a white filling part. The black filling part represents a remaining gas storage capacity, and the white filling part represents a consumed gas storage capacity. In the first acceleration duration, starting from a moment at which the entire icon is filled with the black filling part of the nitrogen consumption progress icon 8021, the area of the black filling part is gradually reduced, and the area of the white filling part is gradually increased, until the entire icon is filled with white. In this case, the first acceleration duration also ends, indicating that the acceleration prop, that is, the acceleration gas (nitrogen) is exhausted.

In some other aspects, the terminal may alternatively set a background icon of the entire acceleration control to progress-variable consumption progress information. For example, in the background icon, a bright part represents a remaining gas storage capacity, and a dark part represents the quantity of consumed acceleration gas. As the time of the first acceleration duration goes by, a visual effect of an increasingly small area of the bright part and an increasingly large area of the dark part is presented. A change in the foregoing bright or dark part may be a gradual change in the form of a horizontal line until the entire acceleration control is changed to dark, or may be a gradual change in the form of a fan-shaped progress bar until the entire circle is changed to dark. The UI change manner of the background icon is not specifically limited in this aspect of this application.

In the foregoing process, the consumption progress information is displayed based on the acceleration control, so that the consumption progress information can be presented visually in the virtual scene, to help the user learn the remaining gas storage capacity conveniently and quickly, which is equivalent to reminding the user of how much time remains before the end moment of the first acceleration duration, to help the user make a decision about a next driving and racing policy with reference to the land form of a subsequent racing track, thereby effectively improving information obtaining efficiency and human-computer interaction efficiency of the user.

307. The terminal consumes another one of the acceleration props in response to a second trigger operation on the acceleration control in the interactable state in the first period of time.

In some aspects, the foregoing second trigger operation on the acceleration control includes but is not limited to: a click operation, a double-click operation, a press operation, a slide operation in a designated direction based on an acceleration control (for example, leftward slide, rightward slide, upward slide, or downward slide), a voice instruction, a gesture instruction, and the like The second trigger operation is not specifically limited in this aspect of this application.

In some aspects, after the second trigger operation performed by the user on the acceleration control in the interactable state is detected in the first period of time, the terminal consumes another one (or more) acceleration prop, but the quantity of acceleration props consumed currently does not exceed the inventory quantity of acceleration props. In combination with the one acceleration prop consumed in the foregoing operation 303, the virtual vehicle is provided with a more powerful acceleration effect than that from a single acceleration prop by using a total of at least two acceleration props.

In some aspects, after the second trigger operation performed by the user on the acceleration control in the interactable state is detected in the first period of time, the terminal can consume only another one acceleration prop again, and then the terminal switches the acceleration control from the interactable state to the non-interactable state, that is, the game setting defines that at most only two acceleration props can be consumed to provide the virtual vehicle with an acceleration effect, which can avoid a case that at least three acceleration props bring an excessively powerful acceleration effect to affect game balance, and can simulate a real world in which speed had better not be excessively high during driving to avoid a safety problem.

Figure 9:
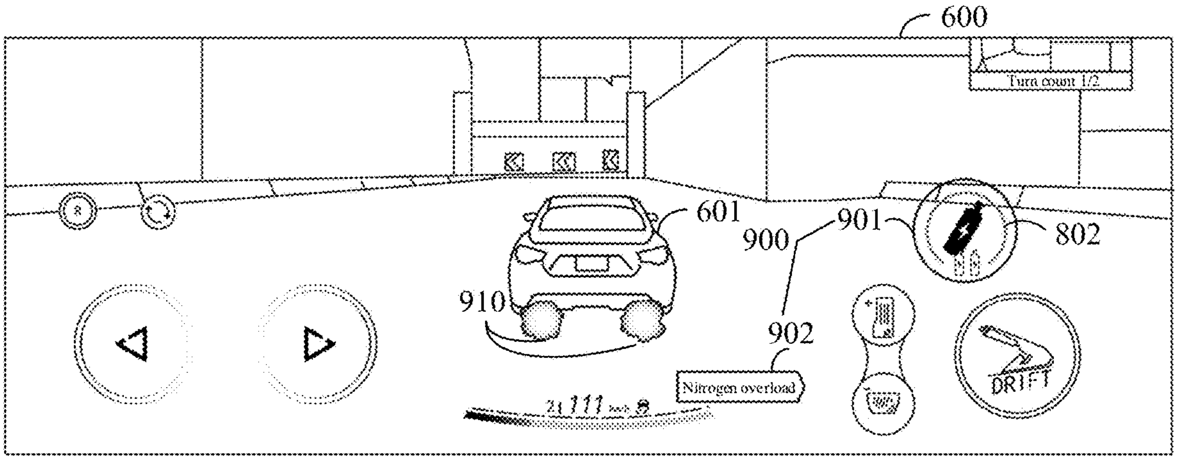
FIG. 9 is a schematic diagram of an interface of a virtual scene according to an aspect of this application.

FIG. 9 is a schematic diagram of an interface of a virtual scene according to an aspect of this application. As shown in FIG. 9, description continues to be made based on the example provided in FIG. 8. The user originally stores two bottles of nitrogen, and consumes one of the bottles of nitrogen (the inventory quantity is changed from 2 to 1) after the nitrogen key is clicked for the first time, and in 0.3 seconds to 1 second after the first time of click, the nitrogen key 802 is set to the interactable state again. Using an example in which the second trigger operation is also a click operation, if the user clicks the nitrogen key 802 again in 0.3 seconds to 1 second, indicating that the user performs the second trigger operation on the nitrogen key 802, one bottle of nitrogen is additionally consumed again, and the virtual vehicle 601 is accelerated based on a total of two bottles of nitrogen consumed by the two clicks. It can be seen that, after the user again clicks the nitrogen key 802 in 0.3 seconds to 1 second, one bottle of inventory nitrogen is again consumed in response to the detected second trigger operation on the nitrogen key 802. In this case, the inventory quantity is changed from 1 to 0. It can be seen that, two nitrogen bottles below the nitrogen key 802 are changed from one black nitrogen bottle and one white nitrogen bottle that are displayed in FIG. 7 to two white nitrogen bottles displayed in FIG. 8, indicating that all the current inventory nitrogen bottles have been used, thereby performing real-time visual feedback on a change in the inventory quantity.

In some other aspects, the user can perform the second trigger operation on the acceleration control a plurality of times in the first period of time, another one acceleration prop is again consumed each time it is detected that the user performs the second trigger operation once, and the acceleration control is switched from the interactable state to the non-interactable state only when the inventory quantity of acceleration props is 0 or the end moment of the first period of time is reached. In this way, the user can be helped individually make, according to the land form environment of the racing track, a decision about how many acceleration props are currently superimposed to achieve a more powerful acceleration effect, so that the user can make full use of accumulated acceleration props to reverse the situation during racing based on the virtual vehicle, thereby increasing interestingness of configuring a racing policy using acceleration props.

In some other aspects, in addition to the foregoing two manners, an interaction manner of consuming all inventory acceleration props at a time is further provided, that is, when a designated operation performed by the user on the acceleration control in the interactable state is detected, all inventory acceleration props are consumed at a time. For example, assuming that both the first trigger operation and the second trigger operation are click operations and the designated operation is a press and hold operation, and assuming that three acceleration props are in inventory at first, the first acceleration prop is consumed to provide acceleration when the user clicks the acceleration control for the first time, and the second acceleration prop is consumed to provide additional acceleration when the user again clicks the acceleration control in the first period of time of the QTE; or all remaining inventory two acceleration props are consumed at a time to provide additional acceleration when the user presses and holds the acceleration control in the first period of time of the QTE. This is not specifically limited in this aspect of this application.

In some aspects, after the second trigger operation performed by the user on the acceleration control in the interactable state is detected in the first period of time, the terminal determines, based on the second trigger operation, the quantity (greater than or equal to 1) of acceleration props currently consumed, and then the inventory quantity of acceleration props is updated to a value obtained by subtracting the quantity of acceleration props currently consumed from the original inventory quantity. In one aspect, when the inventory quantity of acceleration props is further displayed on the acceleration control, a visual change effect of updating the inventory quantity also needs to be reflected, and a detail manner is similar to that in the foregoing operation 303. Details are not described herein.

In some aspects, the terminal may further play a second trigger special effect of the acceleration control in the interactable state in response to the second trigger operation on the acceleration control, where the second trigger special effect is configured for hinting that another one of the acceleration props is consumed to accelerate the virtual vehicle. For example, the second trigger special effect is an aperture special effect dispersing around the acceleration control, and the aperture special effect gradually fades out as the aperture radius expands. In another example, the second trigger special effect includes an aperture special effect and hinting information for a change in the inventory quantity. The second trigger special effect of the acceleration control may be the same as or different from the first trigger special effect of the acceleration control. This is not specifically limited in this aspect of this application. For example, the first trigger special effect and the second trigger special effect are both aperture special effects, but have different colors, and therefore special effects displayed in different situations can be distinguished.

In one aspect, the foregoing second trigger special effect includes: at least one of an animation, a dynamic effect, a moving picture, a picture, a text, a particle special effect, and a magic expression. The representation form of the second trigger special effect is not specifically limited in this aspect of this application.

Description is made by still using FIG. 9 as an example, a second trigger special effect 900 of the nitrogen key 802 is further displayed in the virtual scene 600, and the second trigger special effect 900 includes an aperture special effect 901 dispersing around the nitrogen key 802 and text hinting information 902. The aperture special effect 901 gradually fades out as the aperture radius expands, to help the user learn in time that the current second trigger operation is detected by the terminal, and the text hinting information 902 includes a text "nitrogen overload", to inform the user in a text form that a plurality of bottles of nitrogen are consumed at a time to provide powerful acceleration for the virtual vehicle 601. In one aspect, the second trigger special effect and the first trigger special effect of the nitrogen key may be the same or different. For example, the second trigger special effect and the first trigger special effect are both aperture special effects. However, the first trigger special effect is a blue aperture special effect, and the second trigger special effect is a purple aperture special effect, and therefore special effects displayed in different situations can be distinguished.

In the foregoing process, by playing the second trigger special effect of the acceleration control, a visual special effect for visual interaction feedback can be played for the second trigger operation performed by the user, so that the user learns in time that the current second trigger operation is detected by the terminal, and additional acceleration is provided for the virtual vehicle through at least one acceleration prop consumed again based on acceleration provided through a single acceleration prop that is originally consumed, which can avoid a case that the user does not know whether the terminal detects the second trigger operation, and therefore repeatedly performs the second trigger operation on the acceleration control, thereby improving human-computer interaction efficiency.

308. The terminal controls, based on the one acceleration prop consumed by the first trigger operation and the another one acceleration prop consumed by the second trigger operation, the virtual vehicle to perform a second acceleration action.

An acceleration of the second acceleration action is greater than an acceleration of the first acceleration action.

In some aspects, because the first trigger operation consumes one acceleration prop, and the second trigger operation additionally consumes another one (or more) acceleration props, a total of at least two acceleration props are equivalently consumed to accelerate the virtual vehicle. For how to accelerate the virtual vehicle through at least two (that is, a plurality of) acceleration props, that is, control the virtual vehicle to perform the second acceleration action, reference may be made to description of operation 204 in the previous aspect.

In this aspect of this application, referring to the following operations 3081 to 3084, a possible implementation of accelerating the virtual vehicle by consuming a plurality of acceleration props, to control the virtual vehicle to perform the second acceleration action is shown. Acceleration logic of a plurality of acceleration props is described below using an example in which a single acceleration prop not only applies an acceleration to the virtual vehicle but also increases the limiting speed of the virtual vehicle, and a plurality of acceleration props additionally increase the acceleration based on a single acceleration prop and additionally increase the limiting speed.

3081. The terminal determines a first acceleration, a second acceleration, and a second speed increment that are associated with the acceleration prop.

The first acceleration refers to an acceleration that a single acceleration prop can provide, and the first acceleration is any value greater than 0. For example, the first acceleration is 10 km/h/s.

The second acceleration refers to an acceleration additionally provided by a plurality of acceleration props based on the first acceleration, and the second acceleration is any value greater than 0. For example, the second acceleration is 5 km/h/s.

The second speed increment refers to a speed increment of the limiting speed additionally provided by a plurality of acceleration props based on the first speed increment, and the second speed increment is any value greater than 0. For example, the second speed increment is 10 km/h.

For an obtaining manner for the first acceleration, the second acceleration, and the second speed increment, reference may be made to description of the obtaining manner for the first acceleration and the first speed increment in the foregoing operation 3041, and the two obtaining manners are similar. Details are not described herein.

If the terminal locally downloads prop parameter information of the acceleration prop when performing the foregoing operation 3041, prop parameter information does not need to be repeatedly downloaded in this operation 3081, and it is only necessary to query or read the first acceleration, the second acceleration, and the second speed increment from the locally buffered prop parameter information.

3082. The terminal determines a first speed threshold of the virtual vehicle based on one of the acceleration props that is consumed by the first trigger operation.

For the foregoing operation 3082, refer to description of the obtaining manner for the first speed threshold in the foregoing operation 3042. Details are not described herein. In one aspect, after obtaining the first speed threshold in the foregoing operation 3042, the terminal locally buffers the first speed threshold. In this case, it is unnecessary to calculate the first speed threshold again in this operation 3082, and it is only necessary to query or read the first speed threshold from a local buffer.

3083. The terminal determines a second speed threshold of the virtual vehicle based on the first speed threshold and the second speed increment.

In some aspects, the terminal adds the first speed threshold to the second speed increment, to obtain the second speed threshold. The second speed threshold refers to a maximum speed at which the virtual vehicle is allowed to travel in second acceleration duration in which a plurality of acceleration props take effect, and represents a maximum traveling speed in the second acceleration duration. The second acceleration duration is a subset of the first acceleration duration, and refers to such a time interval ranging from the time of detecting the QTE to the end moment of the first acceleration duration. An increase in the limiting speed by a plurality of acceleration props is time-bound. Only in the second acceleration duration in which a plurality of acceleration props take effect, the limiting speed can be increased to the second speed threshold. After a plurality of acceleration props fail (that is, after the second acceleration duration expires), the maximum traveling speed of the virtual vehicle is reduced from the second speed threshold back to the original limiting speed associated with the vehicle type.

3084. The terminal controls, based on a third acceleration obtained by adding the first acceleration to the second acceleration, the virtual vehicle to perform a second acceleration action, where the traveling speed of the virtual vehicle performing the second acceleration action does not exceed the second speed threshold.

The second speed threshold is determined based on the first speed threshold and the second speed increment, and the first speed threshold is determined based on the limiting speed of the virtual vehicle and the first speed increment.

In some aspects, the terminal adds the first acceleration to the second acceleration, to obtain the third acceleration, and always performs uniform acceleration on the virtual vehicle at the third acceleration in the second acceleration duration, that is, controls the virtual vehicle to perform a uniform acceleration action at the third acceleration, and not to perform acceleration anymore when the traveling speed of the virtual vehicle reaches the second speed threshold. In other words, the acceleration is first changed from the first acceleration to the third acceleration, and then the acceleration is set from the third acceleration to 0 when the traveling speed reaches the second speed threshold. If the initial speed of the virtual vehicle is low, it is very possible that after the second acceleration duration, the virtual vehicle still cannot be accelerated to the second speed threshold, equivalently, the virtual vehicle continuously performs uniform acceleration at the third acceleration in the second acceleration duration. In this way, acceleration logic of the virtual vehicle can be simplified, and calculation overheads of the terminal can be saved.

In the foregoing process, because the third acceleration provided by the plurality of acceleration props is greater than the first acceleration originally provided by a single acceleration prop, a more powerful acceleration effect that cannot be originally provided by a single acceleration prop by consuming a plurality of acceleration props at a time is equivalently provided, thereby enriching acceleration manners for the virtual vehicle.

In some other aspects, the terminal may alternatively implement the foregoing acceleration manner by only obtaining the third acceleration and switching the acceleration from the first acceleration to the third acceleration instead of obtaining the second acceleration. In this way, obtaining logic of the third acceleration can be simplified, and computing resources of the terminal can be saved.

In some aspects, an acceleration manner, similar to that in the foregoing operation 3043, of first performing uniform acceleration and then perform non-uniform acceleration is provided. If the user does not perform the second trigger operation to consume another one (or more) acceleration props again, the virtual vehicle is accelerated in the first acceleration duration always in the acceleration manner provided in the foregoing operation 3043; and if the user performs the second trigger operation to consume another one (or more) acceleration props again, the acceleration manner is switched in the second acceleration duration from the acceleration manner provided in the foregoing operation 3043 to an acceleration manner described below.

In some aspects, an acceleration manner provided a plurality of acceleration props is as follows: A second speed difference associated with the acceleration prop is obtained. The second speed difference refers to a parameter configured for controlling when to switch from uniform acceleration to non-uniform acceleration when a plurality of acceleration props are consumed. When a speed difference relative to the second speed threshold reaches the second speed difference, switching from uniform acceleration to non-uniform acceleration is made. An obtaining manner for the second speed difference is similar to the obtaining manner for the first speed difference in the foregoing operation 3043. Details are not described herein. Then, when a difference between the traveling speed of the virtual vehicle and the second speed threshold is greater than the second speed difference, uniform acceleration is performed on the virtual vehicle at the third acceleration, that is, the virtual vehicle is controlled to perform a uniform acceleration action at the third acceleration. A manner for uniform acceleration is similar to that described in the foregoing operation 3043. Details are not described herein. Then, when a difference between the traveling speed of the virtual vehicle and the second speed threshold is less than or equal to the second speed difference, non-uniform acceleration is performed on the virtual vehicle at a second variable acceleration obtained based on attenuation of the third acceleration, that is, the virtual vehicle is controlled to perform a non-uniform acceleration action at the second variable acceleration. Because the second variable acceleration is obtained from attenuation of the third acceleration, the value of the second variable acceleration does not exceed that of the third acceleration. A manner for non-uniform acceleration is similar to that described in the foregoing operation 3043. Details are not described herein.

In the foregoing process, an acceleration manner of first performing uniform acceleration and then perform non-uniform acceleration is provided, so that when the difference between the traveling speed and the second speed threshold (refers to the limiting speed increased twice) is large, uniform acceleration is performed at the third acceleration, that is, the virtual vehicle is accelerated stably and very quickly; and when the difference between the traveling speed and the second speed threshold is small, an effect of speeding up the virtual vehicle but gradually attenuating the speed increment is maintained through the second variable acceleration obtained from attenuation of the third acceleration. Equivalently, when the traveling speed is closer to the second speed threshold, impact of attenuation of the second variable acceleration on the speed increment is increasingly small, to achieve a transitional effect of gradually and gently increasing to the second speed threshold, and prevent the acceleration from being sharply reduced from the third acceleration to 0 when the second speed threshold is reached, which can simulate a driving experience in the real world that the speed increment is increasingly gentle if the vehicle is close to the limiting speed during acceleration, thereby helping providing the user with an immersive driving atmosphere.

In some aspects, a possible attenuation manner of the second variable acceleration is provided: the second variable acceleration is obtained by linearly attenuating the third acceleration as an initial acceleration according to non-uniform acceleration duration of the virtual vehicle; and when a traveling speed of the virtual vehicle reaches the second speed threshold, the second variable acceleration is just attenuated to 0. In other words, the second variable acceleration is linearly attenuated from the third acceleration, and when the traveling speed of the virtual vehicle can be increased to the second speed threshold in the second acceleration duration, the second variable acceleration is just attenuated to 0. If the traveling speed of the virtual vehicle cannot be increased to the second speed threshold in the second acceleration duration, it is very possible that the second variable acceleration is not attenuated to 0 even when the plurality of acceleration props fail.

In some aspects, in a process in which the second variable acceleration is obtained by linearly attenuating the third acceleration as an initial acceleration according to non-uniform acceleration duration of the virtual vehicle, the third acceleration may be used as the initial acceleration, and the initial acceleration is reduced by a specific attenuation amount in each second, or the initial acceleration is reduced by a specific attenuation amount in each frame. The foregoing attenuation amount may be fixed, or may be increasingly large as the non-uniform acceleration duration increases. This is not specifically limited in this aspect of this application.

In some aspects, in addition to obtaining the second variable acceleration according to linear attenuation of the non-uniform acceleration duration of the virtual vehicle, the second variable acceleration may be further obtained according to linear attenuation of the traveling speed of the virtual vehicle. For example, each time the traveling speed is increased by 10 km/h, the second variable acceleration is attenuated by a specific attenuation amount. In another example, the second variable acceleration is attenuated according to a ratio of a speed difference between the current traveling speed and the second speed threshold to the second speed difference. For example, the second variable acceleration is attenuated to 90% of the third acceleration when the foregoing speed difference accounts for 10% of the second speed difference, the second variable acceleration is attenuated to 80% of the third acceleration when the foregoing speed difference accounts for 20% of the second speed difference, and the rest can be deduced by analog. An attenuation manner of the second variable acceleration is not specifically limited in this aspect of this application.

Assuming that in the second acceleration duration in which the plurality of acceleration props take effect, an excessively small initial speed of the virtual vehicle causes the difference between the traveling speed of the virtual vehicle and the second speed threshold to be still greater than the second speed difference after acceleration is finally completed, uniform acceleration is performed on the virtual vehicle continuously in the second acceleration duration, that is, the virtual vehicle always performs a uniform acceleration action at the third acceleration in the second acceleration duration, and switching from uniform acceleration to non-uniform acceleration does not occur.

In this aspect of this application, description is made by using an example in which when the second trigger operation is detected in a time interval of the QTE, the acceleration effect is improved only using a plurality of acceleration props, but the acceleration duration is not prolonged. In some other aspects, when the second trigger operation is detected, additional acceleration duration may alternatively be added. In this case, the second acceleration duration is not a subset of the first acceleration duration anymore, and the two pieces of acceleration duration have a specific intersection set on a timeline (the intersection set refers to a period of time ranging from the beginning of the operation moment of the second trigger operation to the end moment of the first acceleration duration). After the intersection set, the acceleration prop initially consumed by the first trigger operation runs out, and then at least one acceleration prop consumed only by the second trigger operation takes effect. If only one acceleration prop is additionally consumed by the second trigger operation, the virtual vehicle is accelerated in the acceleration manner for a single acceleration prop provided in operation 3043. If a plurality of acceleration props are additionally consumed by the second trigger operation, the virtual vehicle is still accelerated in the acceleration manner for a plurality of acceleration props provided in operation 3084. However, because the first acceleration prop runs out, the quantity of acceleration props is reduced by one. In this case, increases in the acceleration and the limiting speed in this acceleration manner need to be calculated again. This is not specifically limited in this aspect of this application.

For example, assuming that the current traveling speed of the virtual vehicle is 50 km/h and the limiting speed associated with the vehicle type is 400 km/h, it is set that the first acceleration $a_1$=15 km/h/s, the first speed increment $\Delta v_1$=15 km/h, the second acceleration $a_2$=10 km/h/s, the second speed increment $\Delta v_2$=5 km/h, the first speed difference $y_1$=200 km/h, and the second speed difference $y_2$=100 km/h.

After the user consumes a single acceleration prop through the first trigger operation, the virtual vehicle obtains the fixed first acceleration $a_1$=15 km/h/s, and the limiting speed of the virtual vehicle is increased by the first speed increment $\Delta v_1$=15 km/h based on 400 km/h, that is, the limiting speed is increased to a first speed threshold 400+15=415 km/h. Then, when a difference between the traveling speed of the virtual vehicle and the first speed threshold 415 km/h reaches the first speed difference $y_1$=200 km/h, that is, after the traveling speed reaches 415−200=215 km/h, linear attenuation starts from the fixed first acceleration $a_1$=15 km/h/s to obtain the first variable acceleration, and the first variable acceleration is attenuated to 0 when the traveling speed of the virtual vehicle reaches the first speed threshold 415 km/h.

After the user additionally consumes at least one acceleration prop (using an example of additionally consuming one acceleration prop) through the second trigger operation, the virtual vehicle additionally obtains a second acceleration $a_2$=10 km/h/s based on the first acceleration $a_1$=15 km/h/s, that is, is accelerated at a fixed third acceleration $a_3=a_1+a_2$=25 km/h/s in this case. In addition, the limiting speed is further increased by the second speed increment $\Delta v_2$=5 km/h based on the original first speed threshold 415 km/h, that is, the limiting speed is increased to a second speed threshold 415+5=420 km/h. Then, when a difference between the traveling speed of the virtual vehicle and the second speed threshold 420 km/h reaches the second speed difference $y_2$=100 km/h, that is, after the traveling speed reaches 420−100=320 km/h, linear attenuation starts from the fixed third acceleration $a_3$=25 km/h/s to obtain the second variable acceleration, and the second variable acceleration is attenuated to 0 when the traveling speed of the virtual vehicle reaches the second speed threshold 420 km/h.

The first acceleration duration is 3 seconds, the first acceleration is 10 km/h/s, the first speed threshold is 400 km/h, and the first speed difference is 200 km/h. Evidently, a traveling speed with a difference just equal to the first speed difference 200 km/h from the first speed threshold 400 km/h is 200 km/h. In an example, the initial speed of the virtual vehicle is 100 km/h, and if the traveling speed is increased to 130 km/h after 3 seconds, that is, the traveling speed is still not increased to 200 km/h after the acceleration props are exhausted, uniform acceleration is performed continuously on the virtual vehicle in 3 seconds. In another example, if the initial speed of the virtual vehicle is 190 km/h, the traveling speed is increased to 200 km/h in the 1st second. In this case, uniform acceleration is performed on the virtual vehicle at the first acceleration 10 km/h in the 1st second (a speed amount increased in each frame is also uniform in the 1st second). In the 2nd second to the 3rd second, switching from uniform acceleration to non-uniform acceleration is made, and the acceleration of the non-uniform acceleration is the first variable acceleration. For example, the first variable acceleration is gradually linearly attenuated from the first acceleration 10 km/h as time goes by. For example, the first variable acceleration is 9 km/h in the 2nd second, and the first variable acceleration is 8 km/h in the 3rd second. Only a manner in which the first variable acceleration is linearly attenuated as time goes by is used as an example herein. An attenuation manner of the first variable acceleration is not specifically limited in this aspect of this application.

The acceleration logic of the foregoing operations 3081 to 3084 may be executed by the terminal locally, to save communication overheads of the terminal, or the server may execute the acceleration logic and then deliver the traveling speed calculated frame by frame to the terminal, to save calculation overheads of the terminal. Whether the acceleration logic is executed by the terminal locally or executed by the server is not specifically limited in this aspect of this application.

The foregoing operations 3081 to 3084 involve a possible implementation of accelerating the virtual vehicle through a plurality of acceleration props consumed in total by the first trigger operation and the second trigger operation. Because the third acceleration can bring a higher acceleration for the virtual vehicle than a single acceleration prop does, and the second speed increment can bring a higher limiting speed for the virtual vehicle than a single acceleration prop does, the traveling speed and the limiting speed of the virtual vehicle can be additionally increased by consuming a plurality of acceleration props at a time compared with a case of consuming only a single acceleration prop, this additional increase can help the user make a racing policy to clinch a victory, and the virtual vehicle can be provided with a better acceleration effect, to bring a better acceleration experience for the user.

The foregoing operations 306 to 308 provide a possible implementation of consuming, in the first period of time after the virtual vehicle is accelerated based on a single acceleration prop, another one acceleration prop in response to the second trigger operation on the acceleration control, and accelerating the virtual vehicle based on the at least two acceleration props consumed by two trigger operations, to control the virtual vehicle to perform a second acceleration action. In one aspect, as described in operation 204 in the previous aspect, a plurality of acceleration props may alternatively increase only the traveling speed of the virtual vehicle, but does not increase the limiting speed of the virtual vehicle. An acceleration manner of a plurality of acceleration props is not specifically limited in the aspects of this application.

309. The terminal displays a second acceleration special effect of the virtual vehicle, where the second acceleration special effect is configured for indicating that another one of the acceleration props is consumed to accelerate the virtual vehicle.

In some aspects, the terminal displays the second acceleration special effect of the virtual vehicle based on the virtual vehicle in response to the second trigger operation on the acceleration control, and the second acceleration special effect is displayed around the virtual vehicle. In one aspect, the foregoing second acceleration special effect includes: at least one of an animation, a dynamic effect, a moving picture, a picture, a text, a particle special effect, and a magic expression. The representation form of the second acceleration special effect is not specifically limited in this aspect of this application.

In some aspects, the display resource of the foregoing second acceleration special effect may be loaded locally from the server in advance after round beginning, or may be pulled locally from the server in real time in response to the first trigger operation performed by the user on the acceleration control. The pull occasion of the second acceleration special effect is not specifically limited in this aspect of this application.

For example, description is made by using an example in which the second trigger operation and the first trigger operation performed by the user on the acceleration control are both click operations, the second trigger special effect of the acceleration control is an aperture special effect, and the second acceleration special effect is a tail gas ejecting special effect on the virtual vehicle. After clicking the acceleration control for the first time to consume one acceleration prop, the user clicks the acceleration control again to additionally consume another one (or more) acceleration prop, and then plays the aperture special effect based on the acceleration control, indicating that the click performed by the user successfully consumes another one (or more) acceleration prop additionally, and then the tail gas ejecting special effect is displayed based on an exhaust pipe under the vehicle body of the virtual vehicle, indicating that the at least one additionally consumed acceleration prop begins to have an acceleration effect. The second acceleration special effect in this operation 309 and the first acceleration special effect in the foregoing operation 305 may be the same or different, for example, have different representation forms. For example, significance of the tail gas ejecting effect of the first acceleration special effect is less than significance of the tail gas ejecting effect of the second acceleration special effect, which can explicitly indicate that a plurality of acceleration props have a more powerful acceleration effect than a single acceleration prop.

Description is made by still using FIG. 9 as an example. Referring to FIG. 9, in the virtual scene 600, a second acceleration special effect 910 is further displayed near an exhaust pipe under the vehicle body of the virtual vehicle 601. For example, the second acceleration special effect 910 is provided as a tail gas ejecting special effect, and is configured for simulating an effect of injecting a plurality of bottles of liquid nitrogen oxide $N_2O$ into an engine by using the principle of the NOS system in a real world, to instantaneously provide the virtual vehicle 601 with a higher horsepower than a single bottle of nitrogen and then exhaust tail gas through the exhaust pipe. The second acceleration special effect 910 can improve simulation fidelity of the racing car game, and can help provide the user with an immersive experience. It can be seen that, although the second acceleration special effect 910 shown in FIG. 9 and the first acceleration special effect 710 shown in FIG. 7 are both tail gas ejecting special effects, the second acceleration special effect 910 is evidently more significant than the first acceleration special effect 710 (that is, the tail gas ejecting effect is cooler). Both the first acceleration special effect 710 and the second acceleration special effect 910 belong to instantaneous air injection acceleration special effects achieved after some actions are performed completely in the racing car game, and may be commonly known as a “minor injection” special effect.

In the foregoing process, by displaying the second acceleration special effect, the user can be reminded in time that the virtual vehicle is provided with a more powerful acceleration effect through another one (or more) additionally consumed acceleration prop in response to the second trigger operation, thereby hinting the amount of information carried in the virtual scene, bringing a richer visual feedback, and optimizing the user experience.

In some aspects, when the acceleration effect of the acceleration prop is exhausted (for example, acceleration gas is used up, or acceleration duration runs out), the traveling speed of the virtual vehicle does not continue to increase anymore. In this case, if the traveling speed of the virtual vehicle exceeds the original limiting speed associated with the vehicle type, the virtual vehicle gradually recovers to the original limiting speed associated with the vehicle type. For example, the original limiting speed is 400 km/h, and is increased to a higher limiting speed of 405 km/h in a process in which the acceleration prop takes effect, and after the acceleration prop fails, the traveling speed of the virtual vehicle gradually decreases from 405 km/h and returns to 400 km/h. In addition, if the traveling speed of the virtual vehicle does not exceed the original limiting speed associated with the vehicle type, the virtual vehicle continues to move forward at the increased traveling speed.

Figure 10:
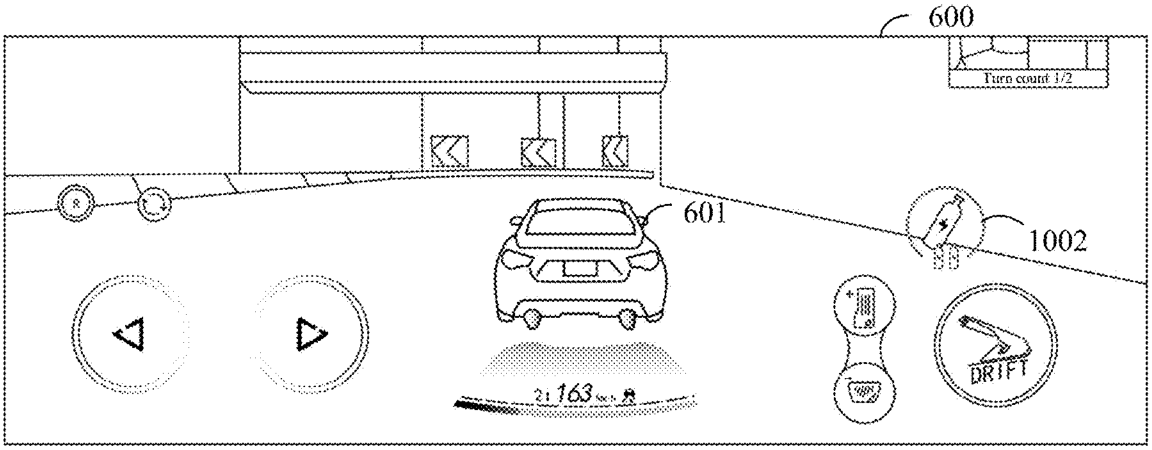
FIG. 10 is a schematic diagram of an interface of a virtual scene according to an aspect of this application.

FIG. 10 is a schematic diagram of an interface of a virtual scene according to an aspect of this application. As shown in FIG. 10, description continues to be made based on the example provided in FIG. 9. The user originally stores two bottles of nitrogen, consumes the first bottle of nitrogen through the first trigger operation (first click), and consumes the second bottle of nitrogen through the second trigger operation (one more click in 0.3 seconds to 1 second after the first click). Then, the virtual vehicle 601 is provided with a powerful acceleration effect based on the two bottles of nitrogen. After the two bottles of nitrogen are exhausted, the nitrogen key is set to the non-interactable state, for example, a nitrogen key 1002 in the non-interactable state shown in FIG. 10 (for example, the button is darkened or the button is in gray). Then, the virtual vehicle 601 gradually recovers to a normal traveling state. To be specific, if the traveling speed of the virtual vehicle 601 does not exceed the original limiting speed associated with the vehicle type, the virtual vehicle continues to move forward at the increased traveling speed; and if the traveling speed of the virtual vehicle 601 exceeds the original limiting speed associated with the vehicle type, the virtual vehicle gradually recovers to the original limiting speed associated with the vehicle type.

Any combination of the foregoing optional technical solutions may be used to obtain an optional aspect of the present disclosure. Details are not described herein.

In the method provided in this aspect of this application, A prop storage mechanism in which special effect action is performed to accumulate acceleration energy and an acceleration prop is obtained when the accumulated acceleration energy satisfies a prop addition condition is provided, one acceleration prop is consumed to accelerate a virtual vehicle when a first trigger operation is detected, and in a first period of time after the first trigger operation, if it is detected that a second trigger operation can further consume another acceleration prop, the virtual vehicle is accelerated at a higher acceleration, so that a user can flexibly select, according to a requirement, whether to consume a plurality of acceleration props each time to obtain a higher acceleration, thereby enriching acceleration manners and acceleration effects of the virtual vehicle, making operating policies of acceleration props diversified, helping the user adjust a racing policy based on the virtual vehicle at any time, and improving human-computer interaction efficiency.

In the previous aspect, how to provide the virtual vehicle with different acceleration effects using one or more acceleration props is introduced in detail. In this aspect of this application, how the user obtains an acceleration prop by controlling the virtual vehicle to perform a special effect action is introduced in further detail. Description is made by using an example in which a special effect action is a drift action. However, there is no limit on the types of special effect actions that may be used. The special effect action may be any action that is different from stable traveling and that a user can control a virtual vehicle to perform, and includes but is not limited to: a drift action, a soaring action, a leaping action, an obstacle surmounting action, a collision action, and the like. Types of special effect actions are not specifically limited in the aspects of this application.

In addition to collecting an acceleration prop by performing a special effect action, an acceleration prop may be further obtained by surmounting an obstacle to collide with the acceleration prop, by consuming virtual resources in a mall to purchase the acceleration prop, or in another manner. Sources of acceleration props are not specifically limited in the aspects of this application.

Figure 11:
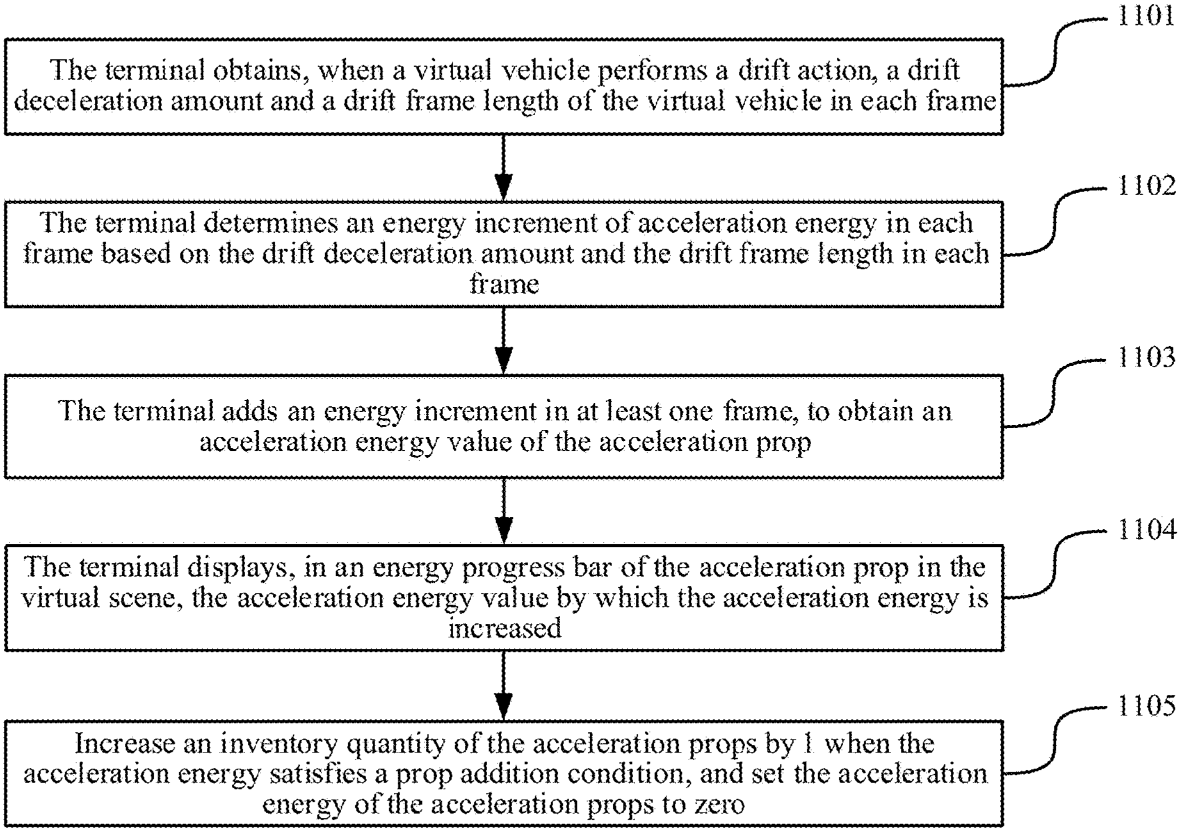
FIG. 11 is a flowchart of a method for obtaining an acceleration prop in a virtual scene according to an aspect of this application.

FIG. 11 is a flowchart of a method for obtaining an acceleration prop in a virtual scene according to an aspect of this application. Referring to FIG. 11, this aspect is performed by an electronic device, and description is made by using an example in which the electronic device is a terminal. The terminal may be the first terminal 120 or the second terminal 160 shown in the foregoing implementation environment. When a special effect action is a drift action, this aspect includes the following operations:

1101. The terminal obtains, when a virtual vehicle performs a drift action, a drift deceleration amount and a drift frame length of the virtual vehicle in each frame.

In some aspects, if the inventory quantity of acceleration props is less than the inventory capacity, it indicates that there is still a surplus inventory capacity to store acceleration props. In this case, if it is detected that the user controls the virtual vehicle to perform a drift action (the user usually presses a hand brake key in collaboration with a direction key, to control the virtual vehicle to perform a drift action), to cause the virtual vehicle to be in a drift state, a drift deceleration amount and a drift frame length of the virtual vehicle in a current frame can be obtained in real time in each frame in a game battle for the virtual vehicle performing the drift action. The drift frame length refers to playing duration of the current frame. For example, at a frame rate of 60, playing duration of each frame is approximately 0.016 seconds. The drift deceleration amount refers to a speed change value of the virtual vehicle performing deceleration in the current frame, and the drift deceleration amount of 10 km/h indicates that the speed of the virtual vehicle is reduced by 10 km/h in the current frame.

Figure 12:
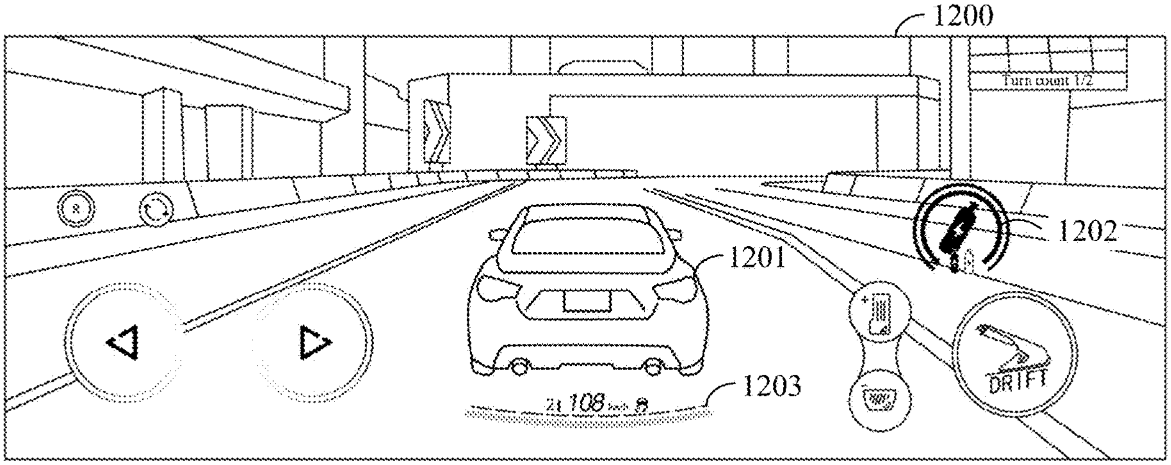
FIG. 12 is a schematic diagram of an interface of a virtual scene according to an aspect of this application.

FIG. 12 is a schematic diagram of an interface of a virtual scene according to an aspect of this application. As shown in FIG. 12, a virtual vehicle 1201, a nitrogen key 1202, and a nitrogen energy progress bar 1203 are displayed in a virtual scene 1200. Assuming that there is one bottle of nitrogen in inventory and one bottle of nitrogen can be further stored, one black gas storage bottle and one white gas storage bottle are displayed on the nitrogen key 1202. The black gas storage bottle represents the quantity of nitrogen in inventory (that is, the inventory quantity), and the white gas storage bottle represents the quantity of remaining nitrogen that can be further stored (that is, a value obtained by subtracting the inventory quantity from the inventory capacity). Because the inventory quantity of nitrogen is less than the inventory capacity in this case, the user can control the virtual vehicle to enter a drift state, to accumulate one new bottle of nitrogen. Assuming that before the user starts a drift operation, the nitrogen energy progress bar 1203 is in a progress shown in FIG. 12, it can be seen that, a nitrogen energy value currently displayed by the nitrogen energy progress bar 1203 is approximately equal to 0.

1102. The terminal determines an energy increment of acceleration energy in each frame based on the drift deceleration amount and the drift frame length in each frame.

When the special effect action is a drift action, an energy increment of the acceleration energy is positively correlated with drift duration in which the virtual vehicle performs the drift action and a drift deceleration amount.

In some aspects, the terminal obtains a speed difference gas collection efficiency constant a and a unit time gas collection efficiency constant b. The speed difference gas collection efficiency constant a is multiplied by a drift deceleration amount $\Delta v$, to obtain a first value $a \times \Delta v$. The unit time gas collection efficiency constant b is multiplied by a drift frame length $\Delta t$, to obtain a second value $b \times \Delta t$. By adding the first value $a \times \Delta v$ to the second value $b \times \Delta t$, an energy increment in the current frame may be obtained: $(a \times \Delta v)+(b \times \Delta t)$.

In some aspects, the speed difference gas collection efficiency constant a and the unit time gas collection efficiency constant b are both buffered locally in advance by the terminal when the virtual scene is loaded, or may be pulled by the terminal in real time from a server. This is not specifically limited in this aspect of this application.

1103. The terminal adds an energy increment in at least one frame, to obtain an acceleration energy value of the acceleration prop.

In some aspects, the terminal can obtain an energy increment in each frame through the foregoing operations 1101 and 1102, and then adds an energy increment in at least one frame in which the virtual vehicle performing a drift action is located, to obtain acceleration energy value of the acceleration prop.

In some aspects, assuming that the virtual vehicle performs a drift for a total of drift duration t, acceleration energy increased in total in the current drift may be referred to as a single drift accumulated amount, and the single drift accumulated amount is represented as the following formula:

$$\text{Single drift accumulated amount} = \sum_{\text{Drift duration } t} ((a \times \Delta v) + (b \times \Delta t))$$

where a represents the speed difference gas collection efficiency constant, b represents the unit time gas collection efficiency constant, $\Delta v$ represents the drift deceleration amount, and $\Delta t$ represents the drift frame length.

For example, it is assumed that the unit time is 1 second (1 second is used as the time unit, to calculate an energy increment per second). It is assumed that the speed difference gas collection efficiency constant a=10, the unit time gas collection efficiency constant b=5, and the drift duration t=3 seconds. Assuming that from the 0th second to the 1st second, the drift deceleration amount $\Delta v_1$ of the virtual vehicle is equal to 10 km/h, a nitrogen amount of $a \times \Delta v_1 = 10 \times 10 = 100$ is collected in this one second. Assuming that from the 1st second to the 2nd second, the drift deceleration amount $\Delta v_2$ of the virtual vehicle is equal to 5 km/h, a nitrogen amount of $a \times \Delta v_2 = 10 \times 5 = 50$ is collected in this one second. Assuming that from the 2nd second to the 3rd second, the drift deceleration amount $\Delta v3$ of the virtual vehicle is equal to 2 km/h, a nitrogen amount of $a \times \Delta v3 = 10 \times 2 = 20$ is collected in this one second. Therefore, a nitrogen amount of 100+50+20=170 is collected in total in the three seconds. In this case, plus a nitrogen amount of $b \times t = 5 \times 3 = 15$ rewarded according to the drift duration, a nitrogen amount of 170+15=185 may be obtained in total from the current drift, that is, an acceleration energy value increased by the current drift is equal to 185 in total.

1104. The terminal displays, in an energy progress bar of the acceleration prop in the virtual scene, the acceleration energy value by which the acceleration energy is increased.

In some aspects, the terminal visually presents an accumulated acceleration energy value in the form of an energy progress bar in the virtual scene. Because the current drift action accumulates an acceleration energy value, the terminal displays an increase in the acceleration energy in the energy progress bar of the acceleration energy, that is, an increase in the progress of the energy progress bar.

In one aspect, a minimum energy value of the energy progress bar is 0, and a maximum energy value is an energy value required to satisfy the prop addition condition. For example, when one acceleration prop can be obtained each time a nitrogen amount of 100 is collected, the maximum energy value of the energy progress bar may be set to 100.

In some aspects, a latest progress displayed in the foregoing energy progress bar is equal to a sum of the energy increment calculated in real time frame by frame according to the foregoing operations 1102 and 1103 and an original energy value existing before the current drift action is performed. When the latest acceleration energy value is less than the energy threshold, the prop addition condition is not satisfied, and the acceleration energy value continues to be accumulated. When the latest acceleration energy value is equal to the energy threshold, the prop addition condition is satisfied, and the following operation 1105 is performed.

Figure 13:
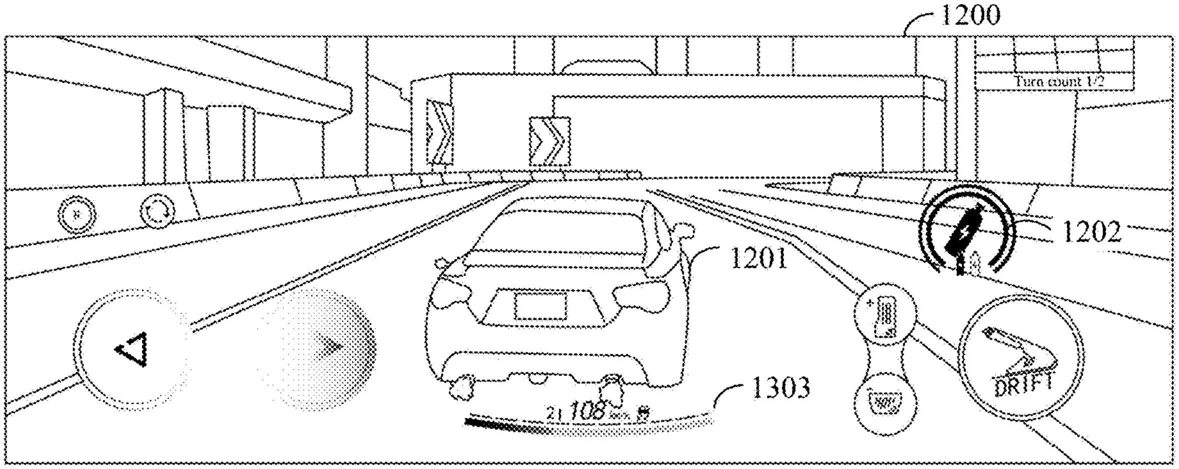
FIG. 13 is a schematic diagram of an interface of a virtual scene according to an aspect of this application.

FIG. 13 is a schematic diagram of an interface of a virtual scene according to an aspect of this application. As shown in FIG. 13, description continues to be made based on the example provided in FIG. 12. The user can press the direction key and the hand brake key to control the virtual vehicle to perform a drift action. As the drift duration and the drift deceleration amount increase, an energy increment of the nitrogen acceleration prop also continuously increases accordingly, and therefore the accumulated acceleration energy value also continuously increases. It can be seen that, compared with the acceleration energy value located on the left of the nitrogen energy progress bar 1203 shown in FIG. 12, after the user controls the virtual vehicle to perform a drift action, the acceleration energy value is gradually changed to an acceleration energy value located in the center of the nitrogen energy progress bar 1303 shown in FIG. 13, indicating that the acceleration energy value is continuously accumulated as the drift duration and the drift deceleration amount increase, to reflect a visual effect of continuously collecting nitrogen.

1105. Increase an inventory quantity of the acceleration props by 1 when the acceleration energy satisfies a prop addition condition, and set the acceleration energy of the acceleration props to zero.

In some aspects, when the accumulated acceleration energy satisfies the prop addition condition, for example, the accumulated acceleration energy is greater than the energy threshold, for example, it is assumed that the energy threshold is 100, each time an acceleration energy value of 100 is collected, one acceleration prop is successfully gained, that is, the inventory quantity of acceleration props is increased by 1. After one acceleration prop is collected, the acceleration energy is set to zero. Then, if the inventory quantity of acceleration props is less than the inventory capacity, a new acceleration prop can still be collected again through operations 1101 to 1105. If the inventory quantity plus 1 equals the inventory capacity, it indicates that a new acceleration prop cannot continue to be collected again in this case.

Figure 14:
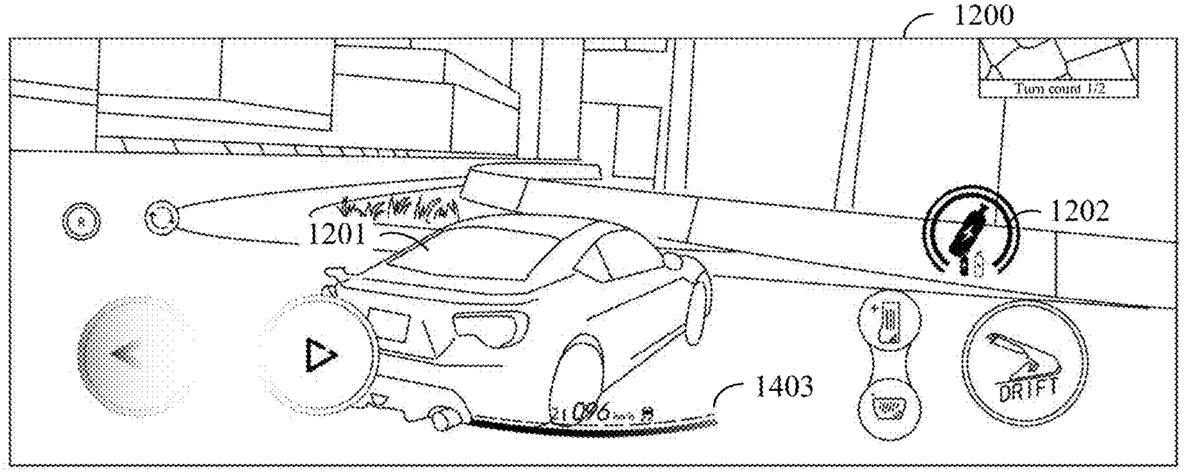
FIG. 14 is a schematic diagram of an interface of a virtual scene according to an aspect of this application.

FIG. 14 is a schematic diagram of an interface of a virtual scene according to an aspect of this application. As shown in FIG. 14, description continues to be made based on the example provided in FIG. 13. The user continuously presses the direction key and the hand brake key to maintain the virtual vehicle in a drift state. As the drift duration and the drift deceleration amount increase, an acceleration energy value of the nitrogen acceleration prop also continuously increases accordingly. It can be seen that, compared with the acceleration energy value located in the center of the nitrogen energy progress bar 1303 shown in FIG. 13, the acceleration energy value is increased from the center of a nitrogen energy progress bar 1403 shown in FIG. 14 to fill the entire nitrogen energy progress bar 1403. To be specific, the maximum progress of the nitrogen energy progress bar 1403 is reached in this case, indicating that the accumulated acceleration energy value reaches the energy threshold. In this case, the accumulated acceleration energy satisfies the prop addition condition, and the virtual vehicle 1201 automatically obtains one nitrogen acceleration prop. To be specific, the inventory quantity of nitrogen acceleration props is increased by 1 in this case, which is equivalent to automatically collecting one bottle of nitrogen.

In some other aspects, even if the inventory quantity plus 1 equals the inventory capacity, and in this case the user can further continue to collect acceleration energy by controlling a virtual vehicle to perform a special effect action, the acceleration energy is stopped from being accumulated when being about to reach the energy threshold. In this way, once the user has consumed one acceleration prop, because the acceleration energy is maintained at a value very close to the energy threshold, the user can fully collect one new acceleration prop quickly by controlling the virtual vehicle to perform a few special effect actions. For example, assuming that the energy threshold is 100, when the inventory quantity is equal to the inventory capacity, the acceleration energy is still allowed to be accumulated. However, when being accumulated to 99, the acceleration energy does not continue to increase anymore. Only after the user has consumed one acceleration prop and then increases the acceleration energy by 1 again by controlling the virtual vehicle to perform a special effect action, one new acceleration prop can be quickly obtained.

Figure 15:
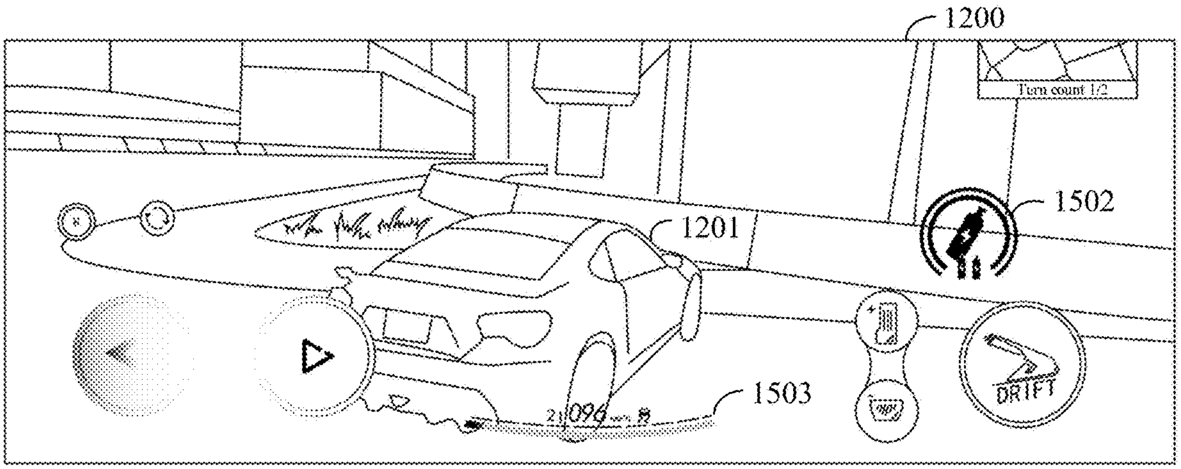
FIG. 15 is a schematic diagram of an interface of a virtual scene according to an aspect of this application.

FIG. 15 is a schematic diagram of an interface of a virtual scene according to an aspect of this application. As shown in FIG. 15, description continues to be made based on the example provided in FIG. 15. After the user automatically accumulates one bottle of nitrogen through the fully collected nitrogen energy progress bar 1403 in FIG. 14, because the inventory quantity of nitrogen acceleration props is automatically increased by 1, the inventory quantity is changed from 1 to 2 after nitrogen is fully collected, and therefore two black nitrogen bottles are displayed on a nitrogen key 1502, indicating that the quantity of bottles having nitrogen stored is changed from 1 to 2. In addition, because the nitrogen energy progress bar 1403 previously collected fully is exchanged for one bottle of nitrogen, a nitrogen energy progress bar 1503 also has the progress set to zero, that is, the current progress in the nitrogen energy progress bar 1503 is switched from the full progress to the zero progress.

In the foregoing operation 1105, a possible implementation of obtaining one of the acceleration props when the accumulated acceleration energy satisfies the prop addition condition is provided, that is, description is made by using an example in which reaching the energy threshold by the acceleration energy is used as the prop addition condition, where the energy threshold is a parameter preset on a server side. For example, the energy threshold may be any value greater than 0, such as 100 or 200. In one aspect, the prop addition condition may alternatively be set to that drift duration is greater than a drift threshold or a drift deceleration amount accumulated by a single drift operation is greater than a deceleration amount threshold, where the drift threshold and the deceleration amount threshold are values greater than 0. The prop addition condition is not specifically limited in the aspects of this application.

The refresh logic of the energy increment in the foregoing operations 1101 to 1105 may be executed by the terminal locally, to save communication overheads of the terminal, or the server may execute the acceleration logic and then deliver the energy increment calculated frame by frame to the terminal, to save calculation overheads of the terminal. Whether the refresh logic of the energy increment is executed by the terminal locally or executed by the server is not specifically limited in this aspect of this application.

In this aspect of this application, a manner of controlling the virtual vehicle to perform a drift action to collect an acceleration prop is provided, which is equivalent to providing an automatic storage mechanism for an acceleration prop. In this way, even if the user may not encounter a proper racing segment to use acceleration props after performing a drift operation, these acceleration props can be stored for subsequent use, to enable, compared with some acceleration manners with a lack of a storage mechanism, the user to flexibly use the acceleration props according to a racing requirement of the user, so that manners for obtaining acceleration props are richer and more diversified, thereby improving the user experience.

Further, a case that the acceleration prop is nitrogen is analyzed. Assuming that drift duration of a drift is sufficiently long, a plurality of bottles of nitrogen may be completely collected at a time in one drift, so that a sufficient amount of positive feedback can be obtained for a drift action that the user controls the virtual vehicle to perform, and a case that the nitrogen bar cannot continue to be accumulated after being fully collected does not occur. In addition, after the progress of the nitrogen bar is fully collected, the user may further accumulate a new nitrogen bar again, and can begin to accumulate a new nitrogen acceleration prop without using a stored nitrogen acceleration prop first, so that experience of the user in gas collection is optimized, to break a fixed interaction experience of consuming nitrogen and then collecting gas again in a conventional racing car game equipped with a nitrogen system. In addition, because storage of a plurality of bottles of nitrogen is supported, playability and exhilaration in a nitrogen release process can be improved with reference to the operation solution for consuming a plurality of bottles of nitrogen in a short time provided in the previous aspect, and space for a nitrogen operating policy is enriched, which also better conforms with an acceleration mechanism in a real world that a plurality of bottles of nitrogen are pressed into an engine at a time during car racing, to provide a stronger power by increasing a nitrogen injection amount.

In the foregoing two aspects, how to accelerate the virtual vehicle through one or more acceleration props and how to collect an acceleration prop through a drift operation are separately introduced. In this aspect of this application, a possible acceleration procedure of a virtual vehicle in a racing car game is described using an example in which an acceleration prop is acceleration gas. The acceleration gas involved in this aspect of this application may refer to $N_2O$ used in an NOS system, $N_2O$ is a rewarding acceleration prop collected by performing a drift operation or another operation in the racing car game, and is configured for achieving an acceleration effect, and $N_2O$ is referred to as "nitrogen" in some racing car games.

Figure 16:
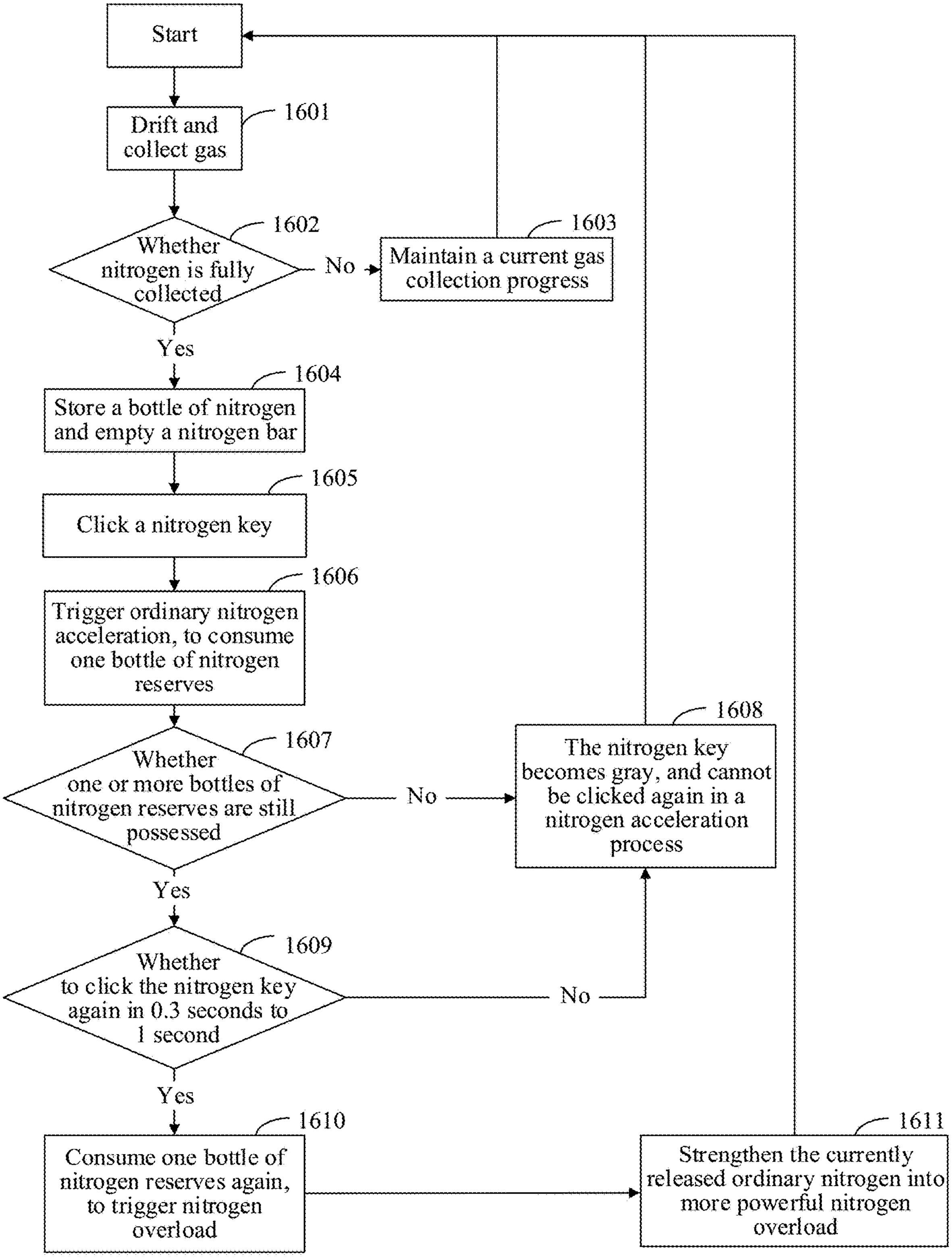
FIG. 16 is a flowchart of a principle of a method for accelerating a virtual vehicle in a racing car game according to an aspect of this application.

FIG. 16 is a flowchart of a principle of a method for accelerating a virtual vehicle in a racing car game according to an aspect of this application. As shown in FIG. 16, the method for accelerating a virtual vehicle includes the following operations:

In operation 1601, a terminal controls a virtual vehicle to drift and collect gas.

To be specific, a user controls, through the terminal, the virtual vehicle to perform a drift action, to increase an accumulation progress value of acceleration energy corresponding to a nitrogen acceleration prop.

In operation 1602, the terminal determines whether nitrogen is fully collected. Operation 1604 is performed if nitrogen is fully collected, or operation 1603 is performed if nitrogen is not fully collected.

To be specific, the terminal determines whether the current accumulation progress value satisfies a prop addition condition. Using an example in which the prop addition condition is that a maximum progress (that is, full progress) of an energy progress bar is reached, if the accumulation progress value reaches the maximum progress of the energy progress bar, it indicates that nitrogen is fully collected, and operation 1604 is performed; or otherwise, if the accumulation progress value does not reach the maximum progress of the energy progress bar, it indicates that nitrogen is not fully collected, and operation 1603 is performed.

In operation 1603, the terminal maintains a current gas collection progress. The process returns to operation 1601.

To be specific, the terminal maintains and displays the current accumulation progress value. The process returns to operation 1601.

In operation 1604, the terminal stores a bottle of nitrogen and empties a nitrogen bar.

To be specific, the terminal increases the inventory quantity of nitrogen bottles by 1, and empties the energy progress bar of the nitrogen acceleration prop.

In operation 1605, the user clicks a nitrogen key on the terminal.

To be specific, because at least one bottle of nitrogen is collected in operation 1604, indicating that a nitrogen acceleration prop is possessed, an acceleration control, that is, the nitrogen key is set to an interactable state. When a first trigger operation is a click operation, the user clicks the nitrogen key in the interactable state.

In operation 1606, the terminal triggers ordinary nitrogen acceleration, to consume one bottle of nitrogen reserves.

To be specific, one bottle of nitrogen is consumed, the inventory quantity of nitrogen bottles is reduced by 1, and the virtual vehicle is accelerated using the one bottle of consumed nitrogen.

In operation 1607, the terminal determines whether one or more bottles of nitrogen reserves are still possessed. If one or more bottles of nitrogen reserves are possessed, operation 1609 is performed. If nitrogen reserves are 0, operation 1608 is performed.

To be specific, the terminal determines whether remaining nitrogen reserves (that is, the inventory quantity of nitrogen acceleration props) are greater than or equal to 1. If nitrogen reserves are greater than or equal to 1, operation 1609 is performed. If nitrogen reserves are less than 1, operation 1608 is performed.

In operation 1608, the terminal controls the nitrogen key to become gray, and cannot click the nitrogen key again in a nitrogen acceleration process.

To be specific, the terminal controls the acceleration control, that is, the nitrogen key to switch from the interactable state to the non-interactable state, and cannot perform any interaction operation through the nitrogen key in the non-interactable state in a nitrogen acceleration process.

In operation 1609, the terminal determines whether the user clicks the nitrogen key again in 0.3 seconds to 1 second. If the user clicks the nitrogen key again in 0.3 seconds to 1 second, operation 1610 is performed. If the user does not click the nitrogen key again in 0.3 seconds to 1 second, the process returns to operation 1608.

To be specific, description is made by using an example in which the first period of time is in 0.3 seconds to 1 second after performing the first trigger operation. The first period of time may alternatively be in 1 second after performing the first trigger operation, or in 1 second to 2 seconds after performing the first trigger operation. This is not specifically limited in this aspect of this application.

When a second trigger operation is a click operation, the terminal determines whether the user clicks the nitrogen key again in 0.3 seconds to 1 second, that is, determines whether the user successfully performs a click operation indicated by such a QTE of consuming a plurality of bottles of nitrogen for acceleration. If the user clicks the nitrogen key again in 0.3 seconds to 1 second, indicating that the QTE is performed successfully, operation 1610 is performed. Otherwise, if the user does not click the nitrogen key again in 0.3 seconds to 1 second, indicating that the QTE is performed unsuccessfully, the process returns to operation 1608.

In operation 1610, the terminal consumes one bottle of nitrogen reserves again, to trigger nitrogen overload.

To be specific, one bottle of nitrogen is consumed again, the inventory quantity of nitrogen bottles is reduced by 1 again, and the virtual vehicle is accelerated using the one bottle of consumed nitrogen and another one bottle of previously consumed nitrogen (a total of two bottles of nitrogen). An effect of accelerating the virtual vehicle by consuming two or more bottles of nitrogen may be referred to as "nitrogen overload".

In operation 1611, the terminal strengthens the currently released ordinary nitrogen into more powerful nitrogen overload.

To be specific, the terminal strengthens an acceleration effect provided by one bottle of nitrogen, to provide the virtual vehicle with a powerful acceleration effect referred to as "nitrogen overload" through two or more bottles of nitrogen. For acceleration logic in different situations, refer to the foregoing aspects. Details are not described herein.

In this aspect of this application, by designing diversified interaction manners for nitrogen release experience and operating policies in a racing car game, the user is enabled to experience an ordinary acceleration manner of consuming a single bottle of nitrogen and a nitrogen overload acceleration manner of consuming a plurality of bottles of nitrogen, and the user is enabled to freely plan a use gain of a nitrogen acceleration prop according to a length of a straight course in the virtual scene, to help maximize the use gain of the nitrogen prop, thereby expanding the depth of the playing method and policy provided through the nitrogen acceleration prop in the racing car game.

Figure 17:
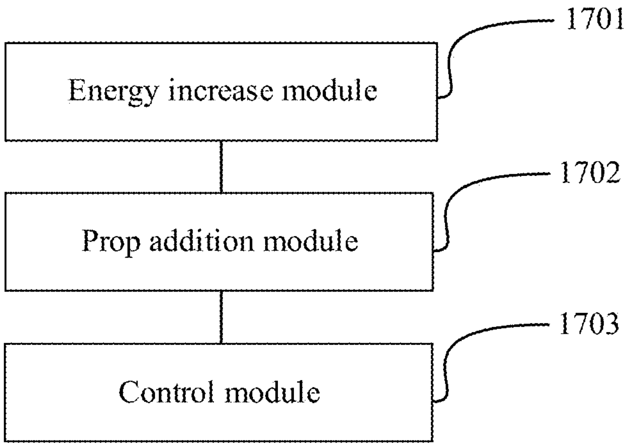
FIG. 17 is a schematic structural diagram of an apparatus for controlling a virtual vehicle in a virtual scene according to an aspect of this application.

FIG. 17 is a schematic structural diagram of an apparatus for controlling a virtual vehicle in a virtual scene according to an aspect of this application. Referring to FIG. 17, the apparatus includes:

an energy increase module 1701, configured to increase acceleration energy when a virtual vehicle performs a special effect action;

a prop addition module 1702, configured to add one acceleration prop when the acceleration energy satisfies a prop addition condition; and a control module 1703, configured to consume, when at least two acceleration props are provided, one of the acceleration props in response to a first trigger operation on an acceleration control, and control the virtual vehicle to perform a first acceleration action, the control module 1703 being further configured to consume another one of the acceleration props in response to a second trigger operation on the acceleration control in a first period of time after the first trigger operation, and control the virtual vehicle to perform a second acceleration action, an acceleration of the second acceleration action being greater than an acceleration of the first acceleration action.

In the apparatus provided in this aspect of this application, A prop storage mechanism in which special effect action is performed to accumulate acceleration energy and an acceleration prop is obtained when the accumulated acceleration energy satisfies a prop addition condition is provided, one acceleration prop is consumed to accelerate a virtual vehicle when a first trigger operation is detected, and in a first period of time after the first trigger operation, if it is detected that a second trigger operation can further consume another acceleration prop, the virtual vehicle is accelerated at a higher acceleration, so that a user can flexibly select, according to a requirement, whether to consume a plurality of acceleration props each time to obtain a higher acceleration, thereby enriching acceleration manners and acceleration effects of the virtual vehicle, making operating policies of acceleration props diversified, helping the user adjust a racing policy based on the virtual vehicle at any time, and improving human-computer interaction efficiency.

In a possible implementation, based on apparatus composition in FIG. 17, the control module 1703 is further configured to:

control, based on a first acceleration associated with the acceleration prop, the virtual vehicle to perform the first acceleration action, where in a process of performing the first acceleration action, a traveling speed of the virtual vehicle does not exceed a first speed threshold, the first speed threshold is determined according to a limiting speed of the virtual vehicle and a first speed increment, and the first speed increment is an acceleration by which a single one of the acceleration props is capable of increasing.

The control module 1703 is further configured to:

control, when a difference between a traveling speed of the virtual vehicle and the first speed threshold is greater than a first speed difference, the virtual vehicle to perform a uniform acceleration action at the first acceleration; and control, when a difference between a traveling speed of the virtual vehicle and the first speed threshold is less than or equal to the first speed difference, the virtual vehicle to perform a non-uniform acceleration action at a first variable acceleration obtained based on attenuation of the first acceleration.

In a possible implementation, the first variable acceleration is obtained by linearly attenuating the first acceleration as an initial acceleration according to non-uniform acceleration duration of the virtual vehicle; and when a traveling speed of the virtual vehicle reaches the first speed threshold, the first variable acceleration is attenuated to 0.

In a possible implementation, based on apparatus composition in FIG. 17, the apparatus further includes:

a playback module, configured to play a first trigger special effect of the acceleration control in response to the first trigger operation on the acceleration control, where the first trigger special effect is configured for hinting that one of the acceleration props is consumed to accelerate the virtual vehicle.

In a possible implementation, based on apparatus composition in FIG. 17, the apparatus further includes:

a display module, configured to display a first acceleration special effect of the virtual vehicle in response to the first trigger operation on the acceleration control, where the first acceleration special effect is configured for indicating that one of the acceleration props is consumed to accelerate the virtual vehicle.

In a possible implementation, based on apparatus composition in FIG. 17, the apparatus further includes:

a display module, configured to display, when the acceleration prop is acceleration gas, consumption progress information of the acceleration gas in response to the first trigger operation on the acceleration control, where the consumption progress information is configured for hinting a remaining gas storage capacity of the acceleration gas.

In a possible implementation, based on apparatus composition in FIG. 17, the control module 1703 is further configured to:

control, based on a third acceleration obtained by adding a first acceleration associated with the acceleration prop to a second acceleration, the virtual vehicle to perform the second acceleration action, where in a process of performing the second acceleration action, a traveling speed of the virtual vehicle does not exceed a second speed threshold, and the second speed threshold is a limiting speed of the virtual vehicle accelerated by the at least two acceleration props.

In a possible implementation, the control module 1703 is further configured to:

control, when a difference between a traveling speed of the virtual vehicle and the second speed threshold is greater than a second speed difference, the virtual vehicle to perform a uniform acceleration action at the third acceleration; and control, when a difference between a traveling speed of the virtual vehicle and the second speed threshold is less than or equal to the second speed difference, the virtual vehicle to perform a non-uniform acceleration action at a second variable acceleration obtained based on attenuation of the third acceleration.

In a possible implementation, the second variable acceleration is obtained by linearly attenuating the third acceleration as an initial acceleration according to non-uniform acceleration duration of the virtual vehicle; and when a traveling speed of the virtual vehicle reaches the second speed threshold, the second variable acceleration is attenuated to 0.

In a possible implementation, based on apparatus composition in FIG. 17, the apparatus further includes:

a display module, configured to display an interaction counting control in the first period of time after the first trigger operation, where the interaction counting control is configured for displaying counting information for the first period of time.

In a possible implementation, based on apparatus composition in FIG. 17, the apparatus further includes:

a playback module, configured to play a second trigger special effect of the acceleration control in response to the second trigger operation on the acceleration control, where the second trigger special effect is configured for hinting that another one of the acceleration props is consumed to accelerate the virtual vehicle.

In a possible implementation, based on apparatus composition in FIG. 17, the apparatus further includes:

a display module, configured to display a second acceleration special effect of the virtual vehicle in response to the second trigger operation on the acceleration control, where the second acceleration special effect is configured for indicating that another one of the acceleration props is consumed to accelerate the virtual vehicle.

In a possible implementation, based on apparatus composition in FIG. 17, the apparatus further includes:

a display module, configured to display an inventory quantity and an inventory capacity of the acceleration props, where the inventory capacity is associated with a vehicle type of the virtual vehicle, and the inventory capacity is configured for indicating a threshold of a quantity of the acceleration props that are allowed by the vehicle type to be stored.

In a possible implementation, the energy increase module 1701 is further configured to:

display an increase in the acceleration energy in an energy progress bar of the acceleration energy.

In a possible implementation, when the special effect action is a drift action, an energy increment of the acceleration energy is in a positive correlation with drift duration in which the virtual vehicle performs the drift action and a drift deceleration amount.

Any combination of the foregoing optional technical solutions may be used to obtain an optional aspect of the present disclosure. Details are not described herein.

When the apparatus for controlling a virtual vehicle in a virtual scene provided in the foregoing aspects controls a virtual vehicle to perform acceleration, only division of the foregoing functional modules is used as an example for description. In the practical application, the functions may be allocated to and completed by different functional modules according to requirements. That is, an internal structure of an electronic device is divided into different functional modules, to complete all or some of the functions described above. In addition, the apparatus for controlling a virtual vehicle in a virtual scene and the aspects of the method for controlling a virtual vehicle provided in the foregoing aspects belong to the same concept. For a specific implementation process, refer to the aspects of the method for controlling a virtual vehicle, and details are not described herein again.

Figure 18:
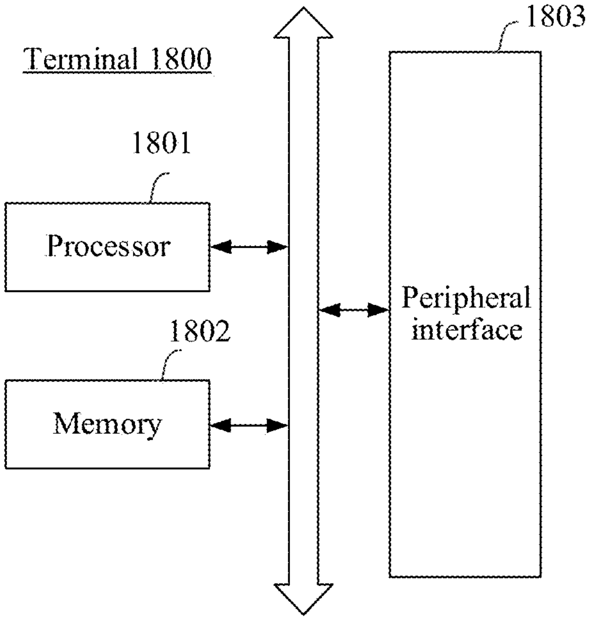
FIG. 18 is a schematic structural diagram of an electronic device according to an aspect of this application.

FIG. 18 is a schematic structural diagram of an electronic device according to an aspect of this application. As shown in FIG. 18, description is made by using an example in which the electronic device is a terminal 1800. In one aspect, a device type of the terminal 1800 includes: a smartphone, a tablet computer, a Moving Picture Experts Group Audio Layer III (MP3) player, a Moving Picture Experts Group Audio Layer IV (MP4) player, a notebook computer, or a desktop computer. The terminal 1800 may also be referred to as another name such as user equipment, a portable terminal, a laptop terminal, or a desktop terminal.

Generally, the terminal 1800 includes: a processor 1801 and a memory 1802.

In one aspect, the processor 1801 may include one or more processing cores, for example, may be a 4-core processor or an 8-core processor. In one aspect, the processor 1801 may be implemented in at least one hardware form of a digital signal processor (DSP), a field-programmable gate array (FPGA), and a programmable logic array (PLA). In some aspects, the processor 1801 includes a main processor and a coprocessor. The main processor is configured to process data in an active state, also referred to as a central processing unit (CPU). The coprocessor is a low-power processor configured to process data in a standby state. In some aspects, the processor 1801 is integrated with a graphics processing unit (GPU). The GPU is configured to render and draw content that needs to be displayed on a display screen. In some aspects, the processor 1801 may further include an AI processor. The AI processor is configured to process a calculation operation related to machine learning.

In some aspects, the memory 1802 includes one or more computer-readable storage media. In one aspect, the computer-readable storage medium is non-transient. In one aspect, the memory 1802 further includes a high-speed random access memory and a non-volatile memory, such as one or more magnetic disk storage devices or flash storage devices. In some aspects, a non-transient computer-readable storage medium in the memory 1802 is configured to store at least one piece of program code, and the at least one piece of program code is configured to be executed by the processor 1801 to implement the method for controlling a virtual vehicle in a virtual scene provided in the aspects of this application.

In some aspects, the terminal 1800 may include a peripheral interface 1803 and at least one peripheral. The processor 1801, the memory 1802, and the peripheral interface 1803 may be connected by a bus or a signal cable. Each peripheral may be connected to the peripheral interface 1803 by a bus, a signal cable, or a circuit board. Specifically, the peripheral includes at least one of a radio frequency circuit, a display screen, a camera assembly, an audio circuit, and a power supply.

A person skilled in the art can understand that the structure shown in FIG. 18 does not constitute a limitation to the terminal 1800, and the terminal may include more or fewer components than those shown in the figure, or some components may be combined, or a different component arrangement may be used.

In some aspects, a computer-readable storage medium, for example, a memory including at least one computer program is further provided. The at least one computer program may be executed by a processor in a terminal to implement the method for controlling a virtual vehicle in a virtual scene in the foregoing aspects. For example, the computer-readable storage medium includes a read-only memory (ROM), a random access memory (RAM), a compact disc read-only memory (CD-ROM), a magnetic tape, a floppy disk, an optical data storage device, or the like.

In some aspects, a computer program product is further provided, including at least one computer program, the at least one computer program being stored in a computer-readable storage medium. One or more processors of an electronic device can read the at least one computer program from the computer-readable storage medium, and the one or more processors execute the at least one computer program to enable the electronic device to perform the method for controlling a virtual vehicle in a virtual scene in the foregoing aspects.

What is claimed is:

1. A method comprising:

receiving first input originating from a terminal, the first input causing a virtual vehicle to perform a special effect action within an interactive virtual environment;

responsive to the special effect action, increasing an acceleration energy value;

adding one acceleration prop when the acceleration energy satisfies a prop addition condition;

receiving first trigger operation input originating from the terminal to consume, when at least two acceleration props are available, one of the acceleration props;

causing, on a graphical user interface (GUI) of the terminal and using a first video effect, display of the virtual vehicle performing a first acceleration action responsive to the first trigger operation input;

causing, on the GUI, responsive to the first trigger operation output, and before a first time window starts, display of an acceleration control interface in a first format corresponding to a non-interactable state;

causing, responsive to one or more acceleration props being available and the first time window being started, display of the acceleration control interface in a second format corresponding to an interactable state, wherein:

the first format indicates the acceleration control interface is configured not to respond to user input; and the second format indicates the acceleration control interface is configured to respond to user input;

receiving, via the acceleration control interface during the first time window, second trigger operation input originating from the terminal to consume another one of the acceleration props; and causing, on the GUI, using a second video effect, and responsive to the second trigger operation input being received during the first time window, display of the virtual vehicle performing a second acceleration action.

2. The method according to claim 1, wherein the causing the display of the virtual vehicle performing the first acceleration action comprises:

controlling, based on a first acceleration associated with the acceleration prop, the virtual vehicle to perform the first acceleration action, wherein in a process of performing the first acceleration action, a traveling speed of the virtual vehicle does not exceed a first speed threshold, the first speed threshold is determined according to a limiting speed of the virtual vehicle and a first speed increment, and the first speed increment is an acceleration by which a single one of the acceleration props is capable of increasing.

3. The method according to claim 2, wherein the causing the display of the virtual vehicle performing the first acceleration action comprises:

controlling, when a difference between a traveling speed of the virtual vehicle and the first speed threshold is greater than a first speed difference, the virtual vehicle to perform a uniform acceleration action at the first acceleration; and controlling, when a difference between a traveling speed of the virtual vehicle and the first speed threshold is less than or equal to the first speed difference, the virtual vehicle to perform a non-uniform acceleration action at a first variable acceleration obtained based on attenuation of the first acceleration.

4. The method according to claim 3, wherein the first variable acceleration is obtained by linearly attenuating the first acceleration as an initial acceleration according to non-uniform acceleration duration of the virtual vehicle; and when a traveling speed of the virtual vehicle reaches the first speed threshold, the first variable acceleration is attenuated to 0.

5. The method according to claim 1, wherein the method further comprises:

playing a first trigger special effect of the acceleration control in response to the first trigger operation input, wherein the first trigger special effect is configured for indicating that one of the acceleration props is consumed to accelerate the virtual vehicle.

6. The method according to claim 1, wherein the method further comprises:

causing display of a first acceleration special effect of the virtual vehicle in response to the first trigger operation input, wherein the first acceleration special effect is configured for indicating that one of the acceleration props is consumed to accelerate the virtual vehicle.

7. The method according to claim 1, wherein the method further comprises:

causing display of, when the acceleration prop is acceleration gas, consumption progress information of the acceleration gas in response to the first trigger operation input, wherein the consumption progress information is configured for indicating a remaining gas storage capacity of the acceleration gas.

8. The method according to claim 1, wherein the causing the display of the virtual vehicle performing a second acceleration action comprises:

controlling, based on a third acceleration obtained by adding a first acceleration associated with the acceleration prop to a second acceleration, the virtual vehicle to perform the second acceleration action, wherein in a process of performing the second acceleration action, a traveling speed of the virtual vehicle does not exceed a second speed threshold, and the second speed threshold is a limiting speed of the virtual vehicle accelerated by the at least two acceleration props.

9. The method according to claim 8, wherein the controlling, based on a third acceleration obtained by adding a first acceleration associated with the acceleration prop to a second acceleration, the virtual vehicle to perform the second acceleration action comprises:

controlling, when a difference between a traveling speed of the virtual vehicle and the second speed threshold is greater than a second speed difference, the virtual vehicle to perform a uniform acceleration action at the third acceleration; and controlling, when a difference between a traveling speed of the virtual vehicle and the second speed threshold is less than or equal to the second speed difference, the virtual vehicle to perform a non-uniform acceleration action at a second variable acceleration obtained based on attenuation of the third acceleration.

10. The method according to claim 9, wherein the second variable acceleration is obtained by linearly attenuating the third acceleration as an initial acceleration according to non-uniform acceleration duration of the virtual vehicle; and when a traveling speed of the virtual vehicle reaches the second speed threshold, the second variable acceleration is attenuated to 0.

11. The method according to claim 1, wherein the method further comprises:

causing display of an interaction counting control in the first time window after the first trigger operation, wherein the interaction counting control is configured for displaying countdown information for the first time window.

12. The method according to claim 1, wherein the method further comprises:

playing a second trigger special effect of the acceleration control in response to the second trigger operation input, wherein the second trigger special effect is configured for indicating that another one of the acceleration props is consumed to accelerate the virtual vehicle.

13. The method according to claim 1, wherein the method further comprises:

causing display of a second acceleration special effect of the virtual vehicle in response to the second trigger operation input, wherein the second acceleration special effect is configured for indicating that another one of the acceleration props is consumed to accelerate the virtual vehicle.

14. The method according to claim 1, wherein the method further comprises:

causing display of an inventory quantity and an inventory capacity of the acceleration props, wherein the inventory capacity is associated with a vehicle type of the virtual vehicle, and the inventory capacity is configured for indicating a threshold of a quantity of the acceleration props that are allowed by the vehicle type to be stored.

15. The method according to claim 1, wherein the increasing acceleration energy comprises:

causing display of an increase in the acceleration energy in an energy progress bar of the acceleration energy.

16. The method according to claim 1, wherein when the special effect action is a drift action, an energy increment of the acceleration energy is in a positive correlation with drift duration in which the virtual vehicle performs the drift action and a drift deceleration amount.

17. One or more non-transitory computer readable media storing computer readable instructions which, when executed, configure a data processing system to perform:

receiving first input originating from a terminal, the first input causing a virtual vehicle to perform a special effect action within an interactive virtual environment;

responsive to the special effect action, increasing an acceleration energy value;

adding one acceleration prop when the acceleration energy satisfies a prop addition condition;

receiving first trigger operation input originating from the terminal to consume, when at least two acceleration props are available, one of the acceleration props;

causing, on a graphical user interface (GUI) of the terminal and using a first video effect, display of the virtual vehicle performing a first acceleration action responsive to the first trigger operation input;

causing, on the GUI, responsive to the first trigger operation output, and before a first time window starts, display of an acceleration control interface in a first format corresponding to a non-interactable state;

causing, responsive to one or more acceleration props being available and the first time window being started, display of the acceleration control interface in a second format corresponding to an interactable state, wherein:

the first format indicates the acceleration control interface is configured not to respond to user input; and the second format indicates the acceleration control interface is configured to respond to user input;

receiving, via the acceleration control interface during the first time window, second trigger operation input originating from the terminal to consume another one of the acceleration props; and causing, on the GUI, using a second video effect, and responsive to the second trigger operation input being received during the first time window, display of the virtual vehicle performing a second acceleration action.

18. The computer readable media of claim 17, wherein the causing the display of the virtual vehicle performing the first acceleration action comprises:

controlling, based on a first acceleration associated with the acceleration prop, the virtual vehicle to perform the first acceleration action, wherein in a process of performing the first acceleration action, a traveling speed of the virtual vehicle does not exceed a first speed threshold, the first speed threshold is determined according to a limiting speed of the virtual vehicle and a first speed increment, and the first speed increment is an acceleration by which a single one of the acceleration props is capable of increasing, and wherein the causing the display of the virtual vehicle performing a second acceleration action comprises:

controlling, based on a third acceleration obtained by adding a first acceleration associated with the acceleration prop to a second acceleration, the virtual vehicle to perform the second acceleration action, wherein in a process of performing the second acceleration action, a traveling speed of the virtual vehicle does not exceed a second speed threshold, and the second speed threshold is a limiting speed of the virtual vehicle accelerated by the at least two acceleration props.

19. A data processing system comprising:

a processor; and memory storing computer readable instructions which, when executed, configure the data processing system to perform:

receiving first input originating from a terminal, the first input causing a virtual vehicle to perform a special effect action within an interactive virtual environment;

responsive to the special effect action, increasing an acceleration energy value;

adding one acceleration prop when the acceleration energy satisfies a prop addition condition;

receiving first trigger operation input originating from the terminal to consume, when at least two acceleration props are available, one of the acceleration props;

causing, on a graphical user interface (GUI) of the terminal and using a first video effect, display of the virtual vehicle performing a first acceleration action responsive to the first trigger operation input;

causing, on the GUI, responsive to the first trigger operation output, and before a first time window starts, display of an acceleration control interface in a first format corresponding to a non-interactable state;

causing, responsive to one or more acceleration props being available and the first time window being started, display of the acceleration control interface in a second format corresponding to an interactable state, wherein:

the first format indicates the acceleration control interface is configured not to respond to user input; and the second format indicates the acceleration control interface is configured to respond to user input;

receiving, via the acceleration control interface during the first time window, second trigger operation input originating from the terminal to consume another one of the acceleration props; and causing, on the GUI, using a second video effect, and responsive to the second trigger operation input being received during the first time window, display of the virtual vehicle performing a second acceleration action.

20. The data processing system of claim 19, wherein the causing the display of the virtual vehicle performing the first acceleration action comprises:

controlling, based on a first acceleration associated with the acceleration prop, the virtual vehicle to perform the first acceleration action, wherein in a process of performing the first acceleration action, a traveling speed of the virtual vehicle does not exceed a first speed threshold, the first speed threshold is determined according to a limiting speed of the virtual vehicle and a first speed increment, and the first speed increment is an acceleration by which a single one of the acceleration props is capable of increasing, and wherein the causing the display of the virtual vehicle performing a second acceleration action comprises:

controlling, based on a third acceleration obtained by adding a first acceleration associated with the acceleration prop to a second acceleration, the virtual vehicle to perform the second acceleration action, wherein in a process of performing the second acceleration action, a traveling speed of the virtual vehicle does not exceed a second speed threshold, and the second speed threshold is a limiting speed of the virtual vehicle accelerated by the at least two acceleration props.

* * * * *